Aug. 6, 1929.  C. O. BROWNELL  1,723,967
BREAD WRAPPING MACHINE
Filed Feb. 21, 1925  17 Sheets-Sheet 5

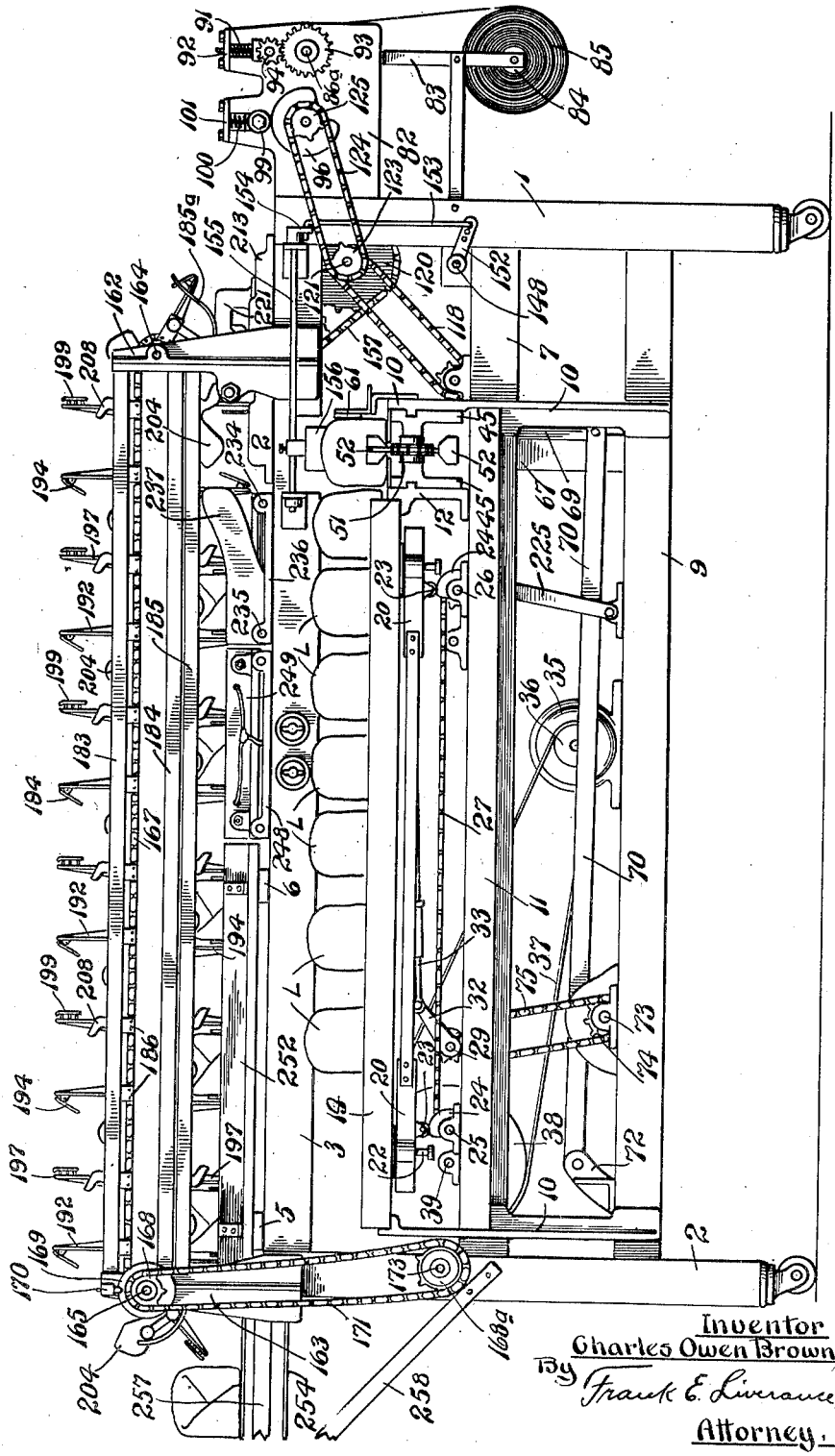

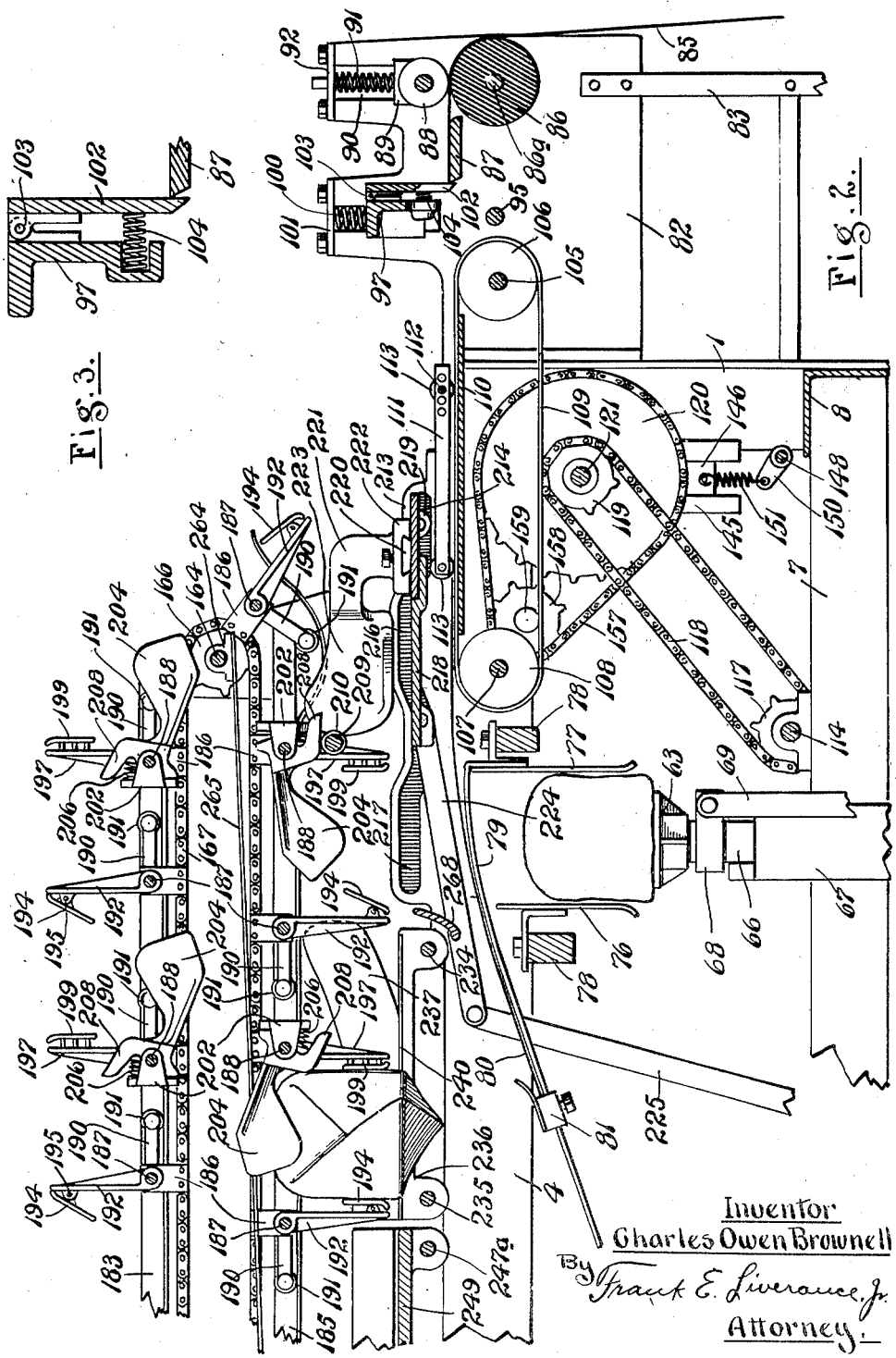

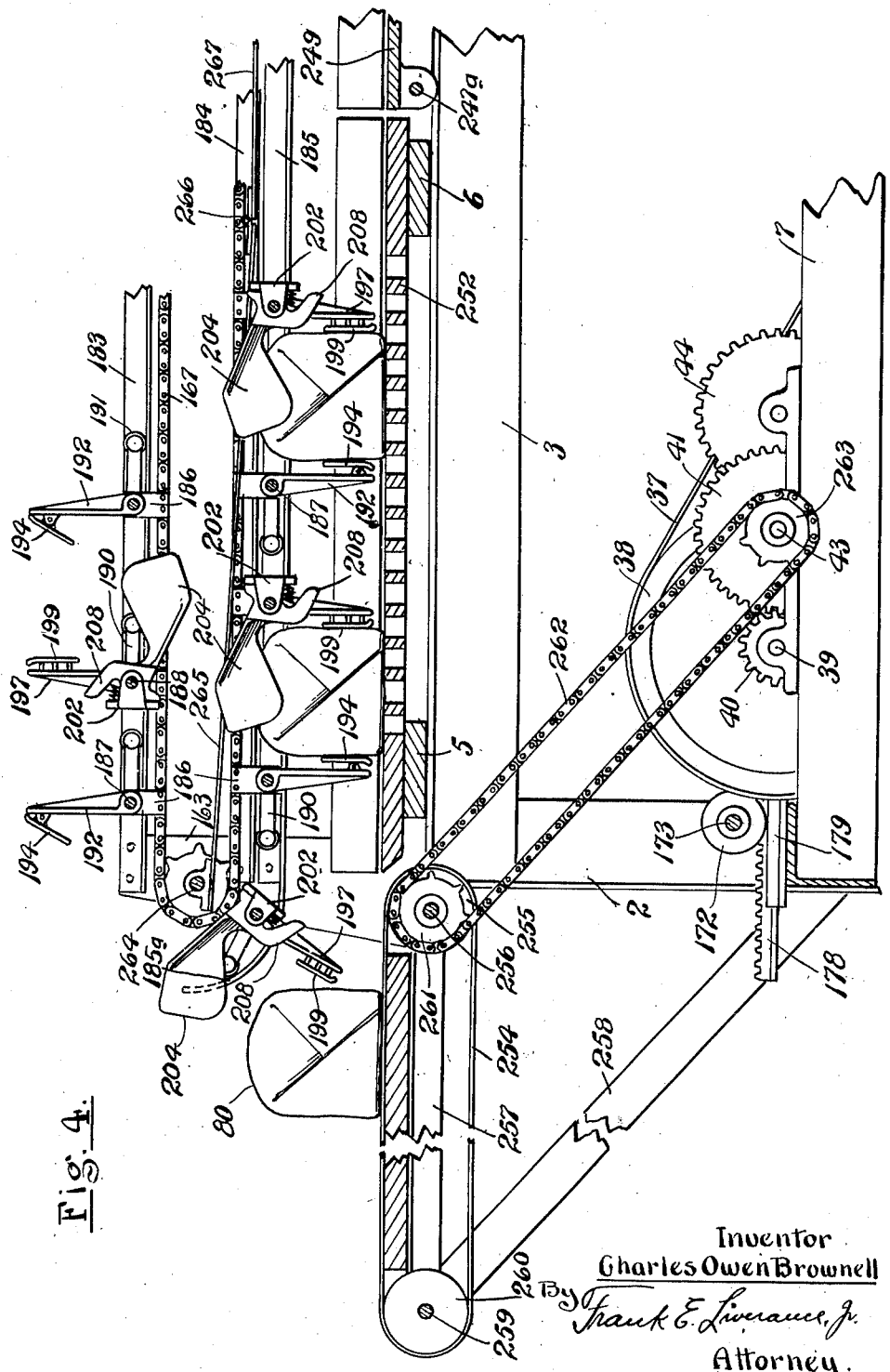

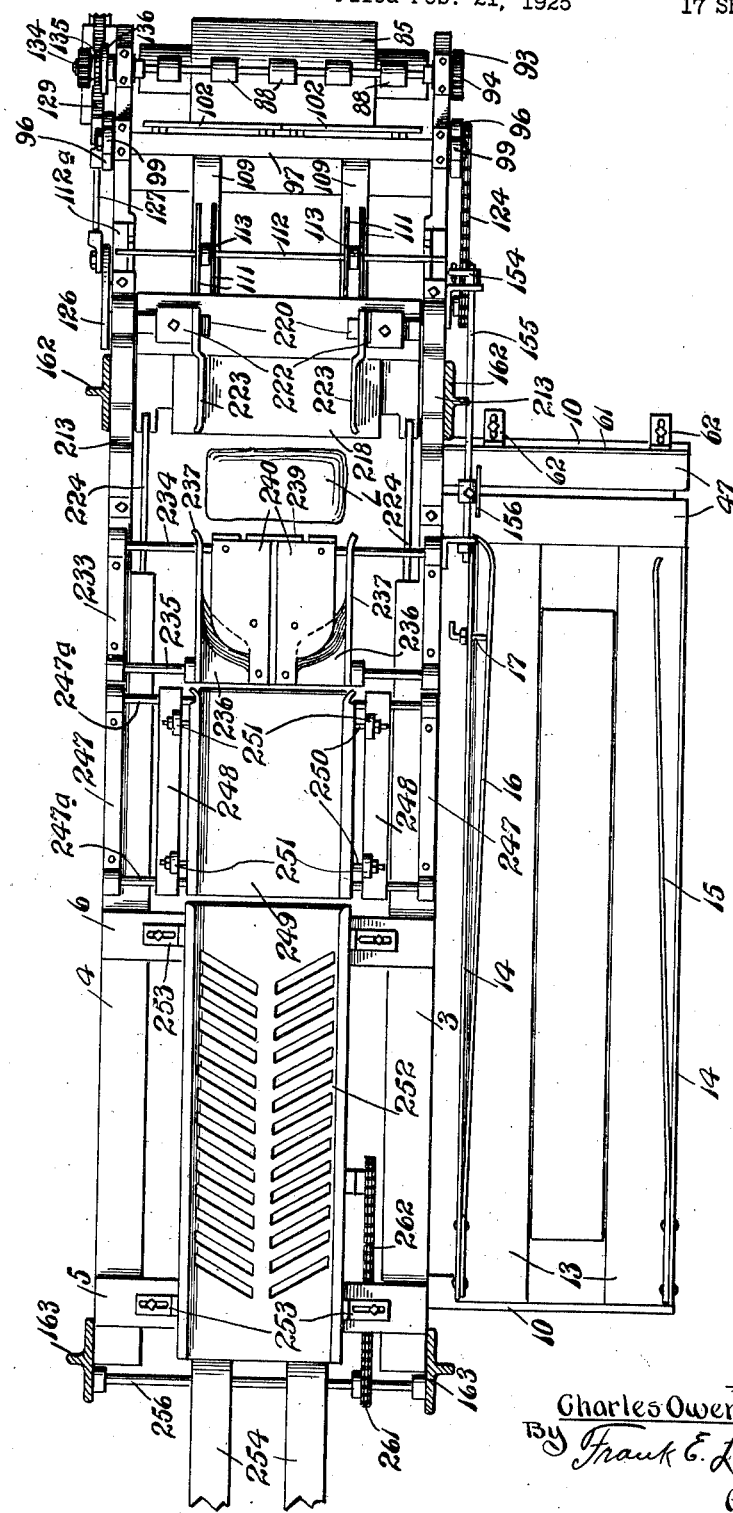

Inventor
Charles Owen Brownell
By Frank E. Liverance Jr.
Attorney

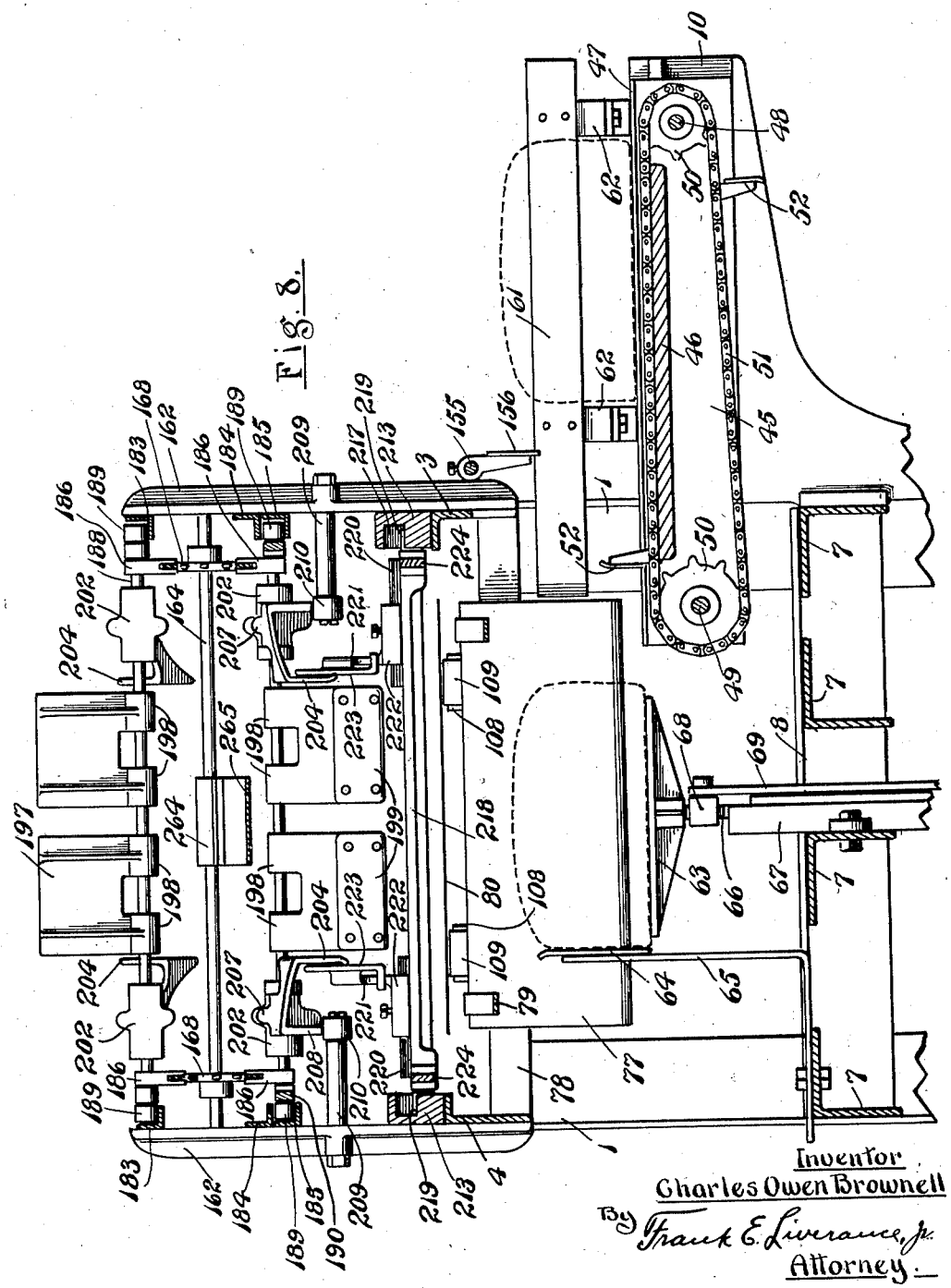

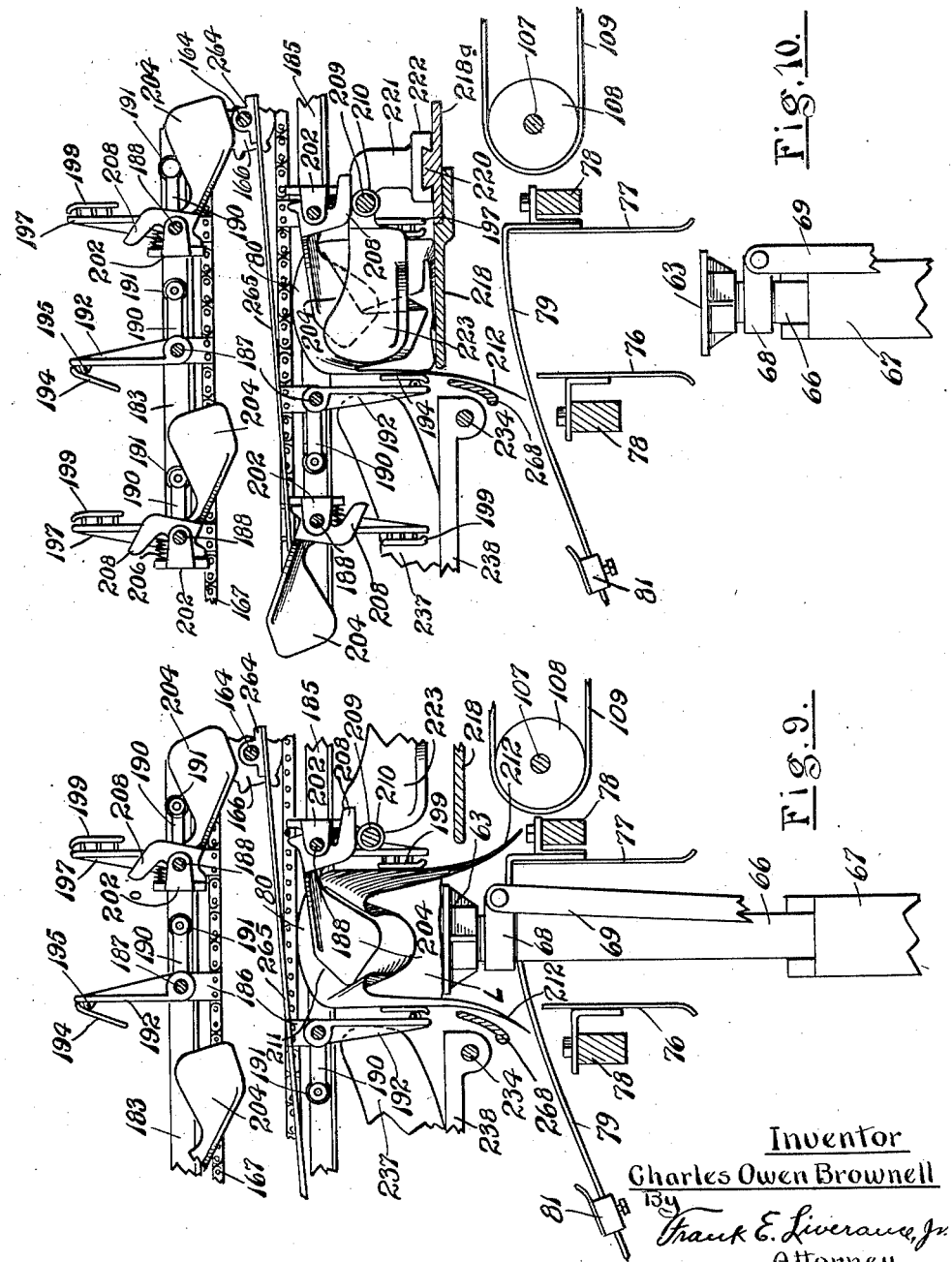

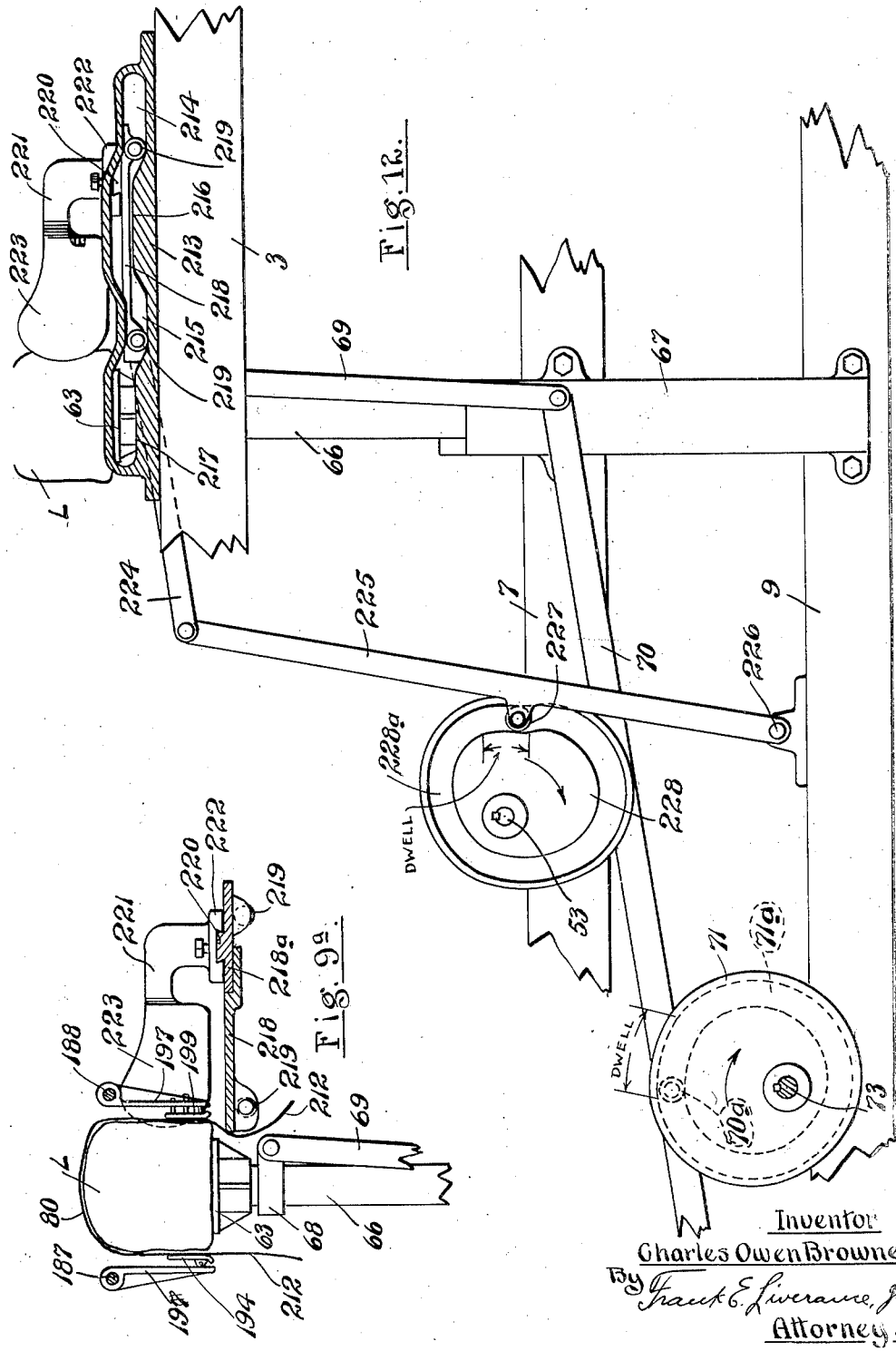

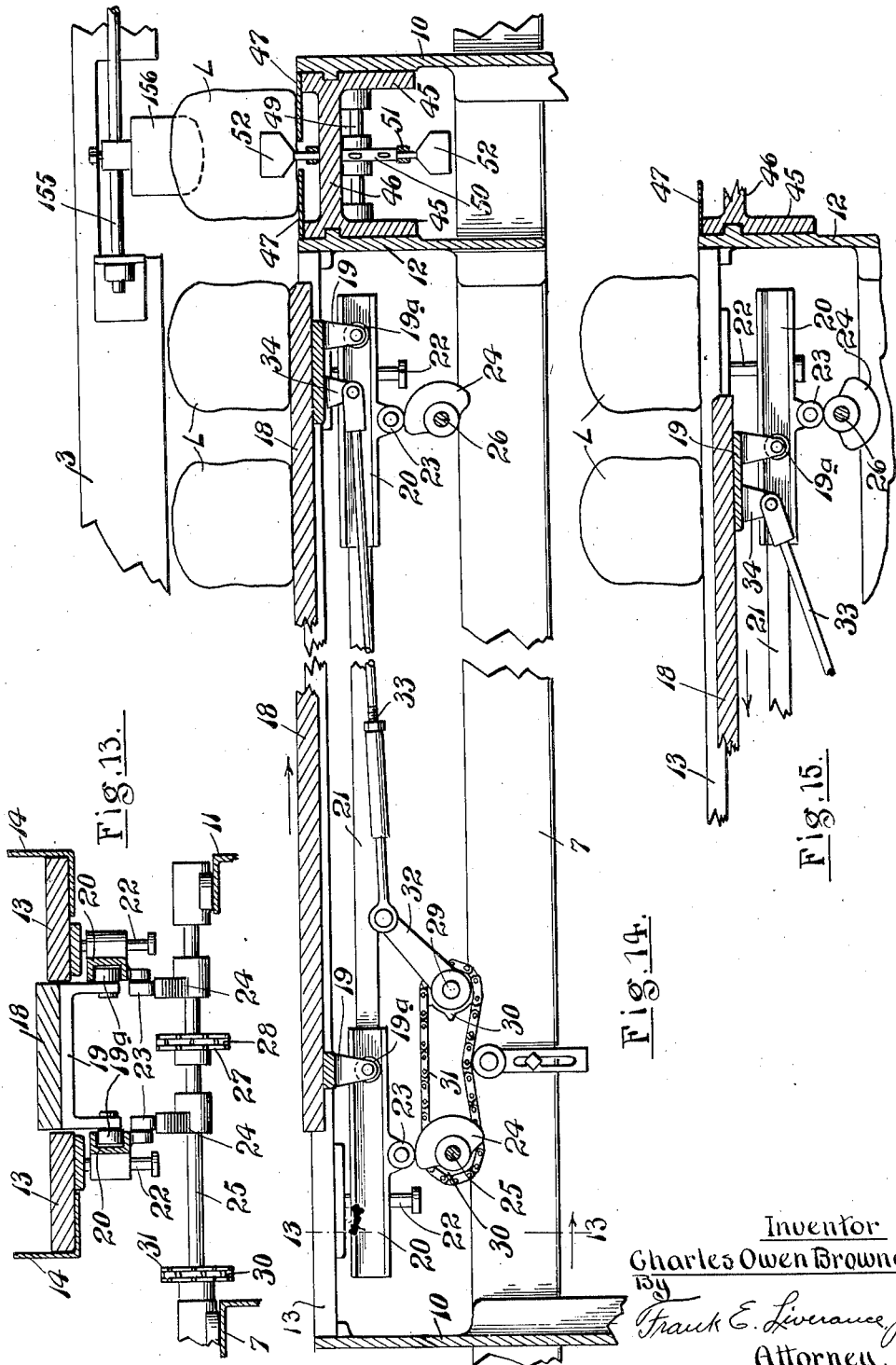

Aug. 6, 1929.　　　C. O. BROWNELL　　　1,723,967

BREAD WRAPPING MACHINE

Filed Feb. 21, 1925　　　17 Sheets-Sheet 11

Inventor
Charles Owen Brownell
By
Frank E. Liverance Jr.
Attorney.

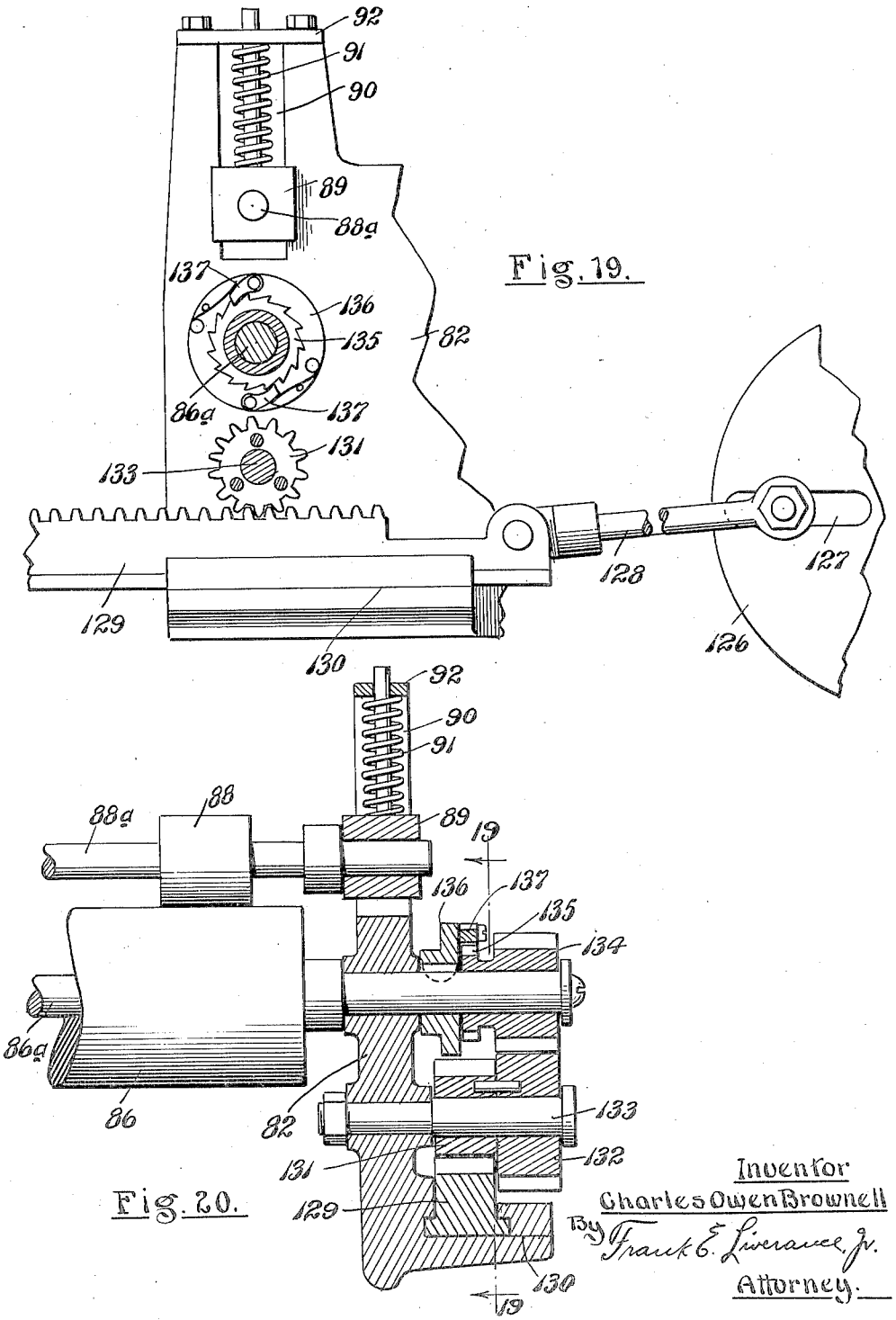

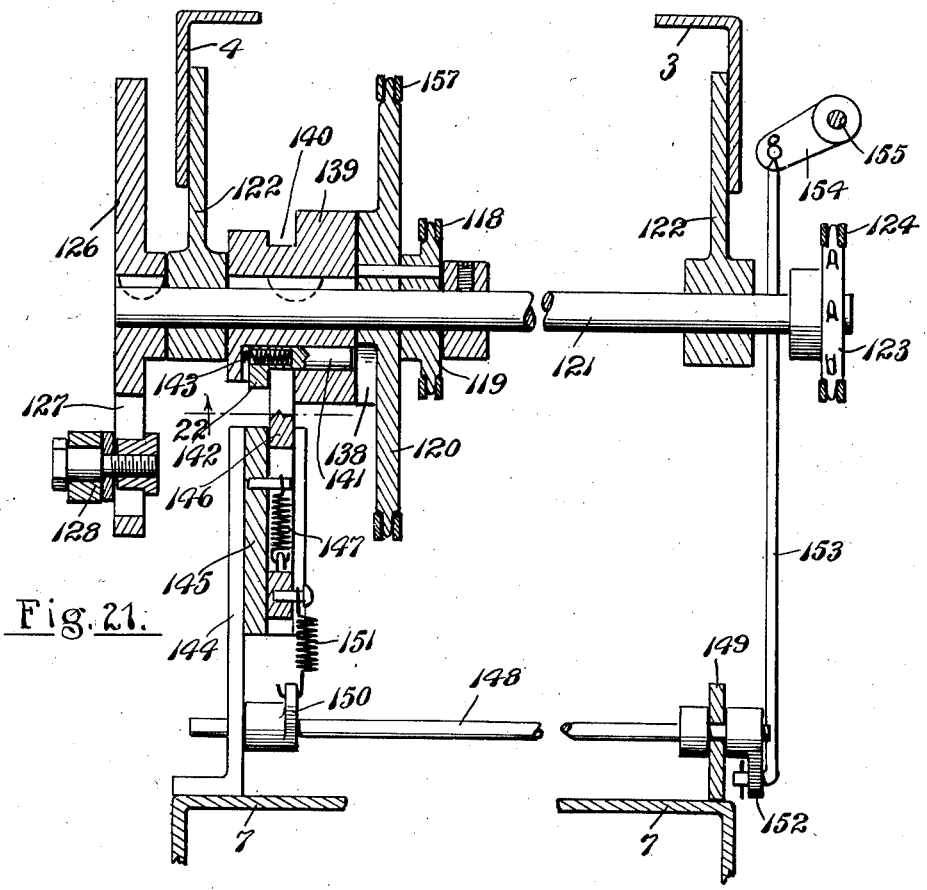
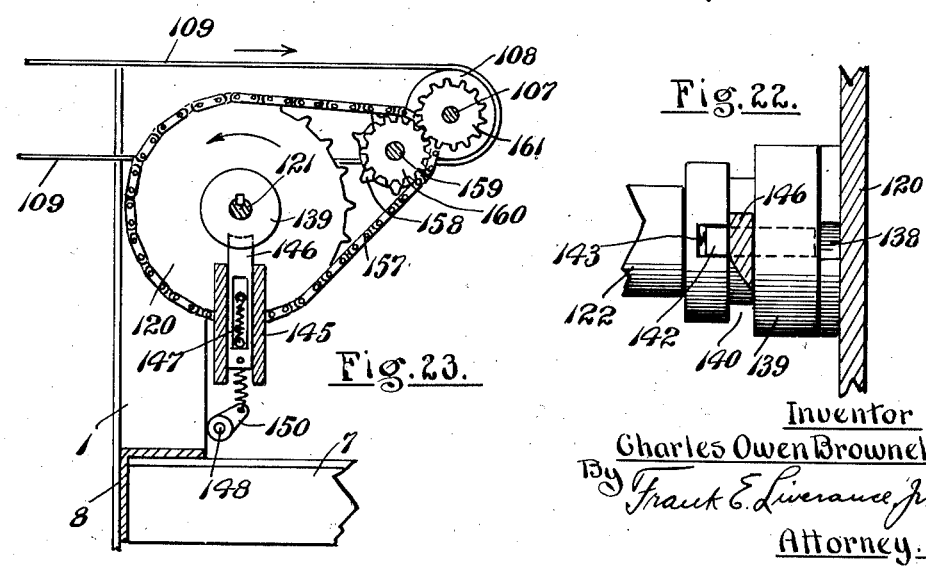

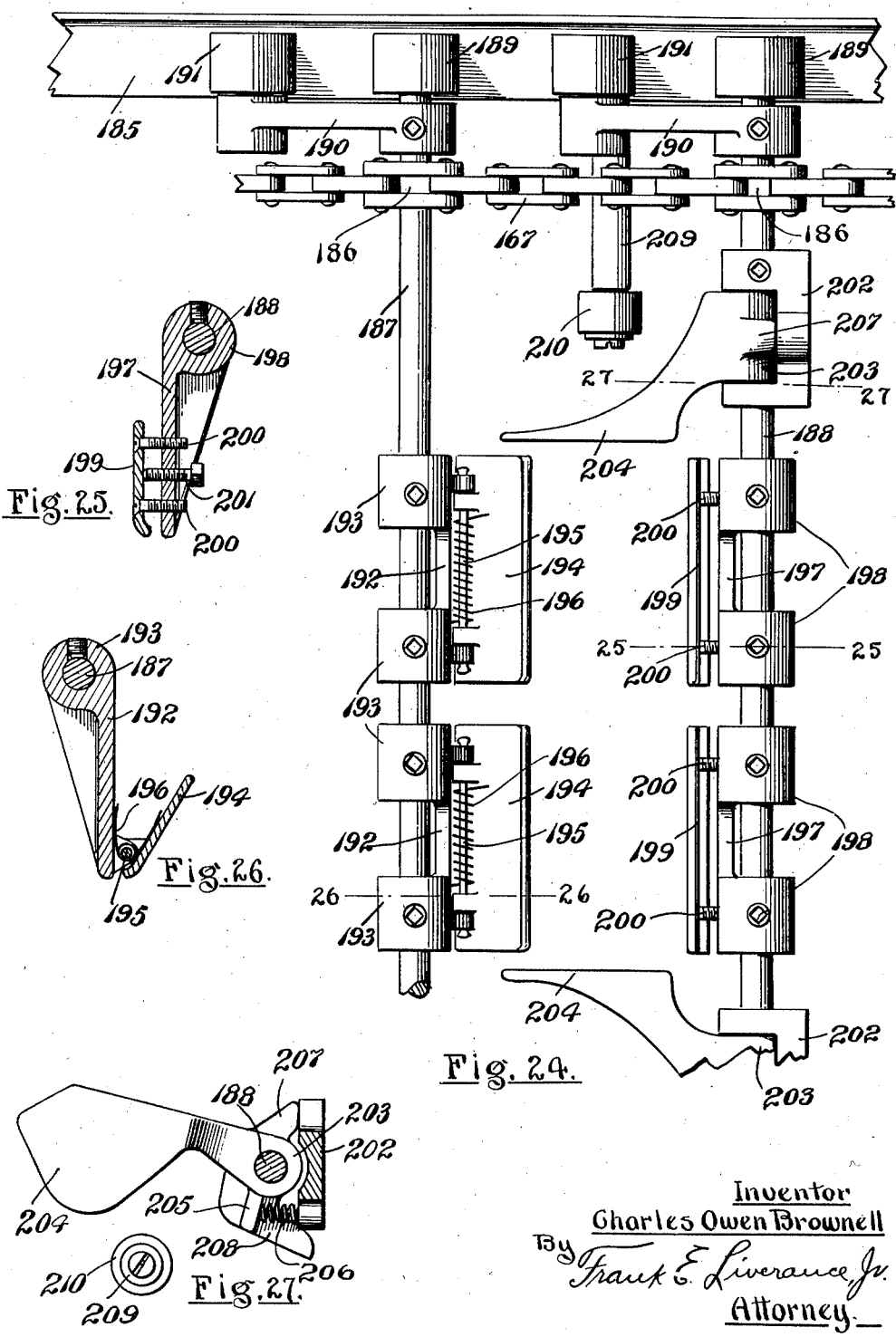

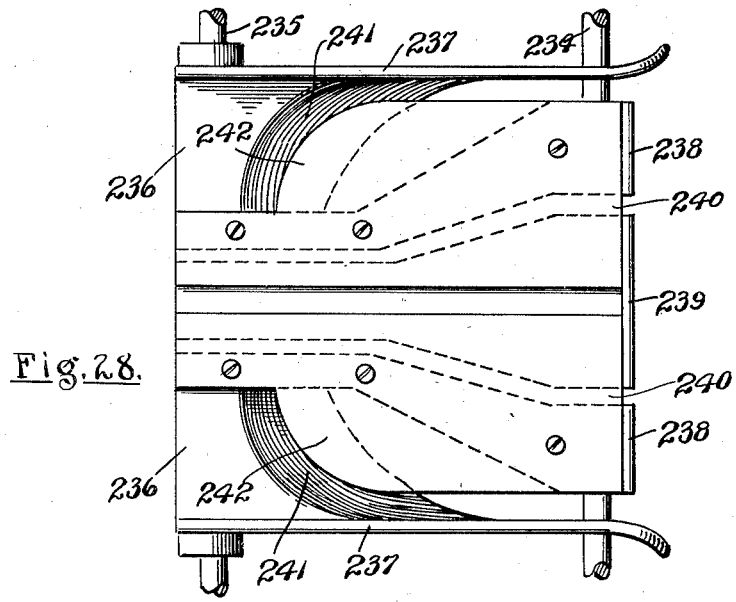
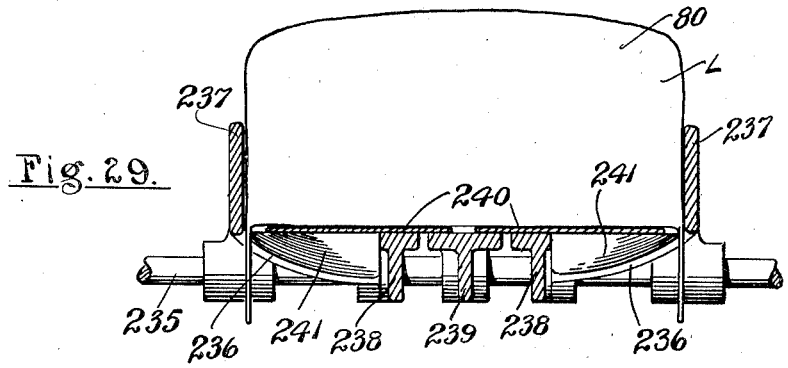
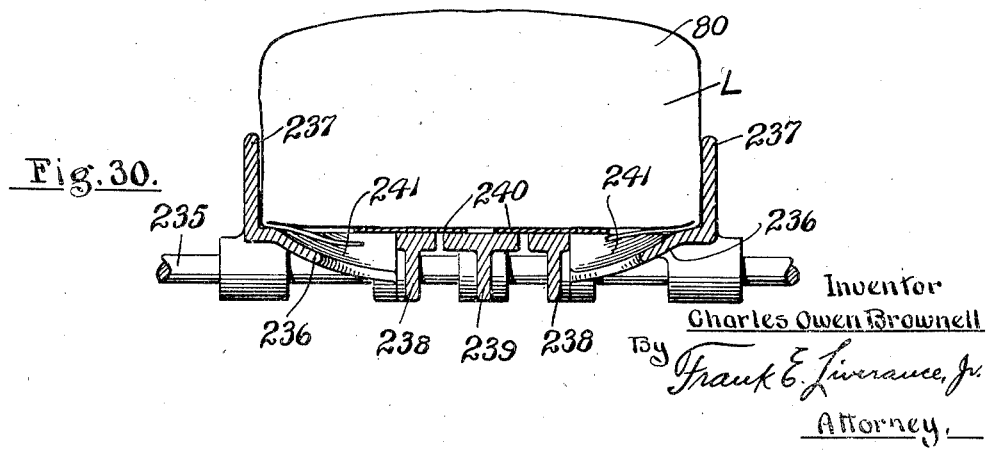

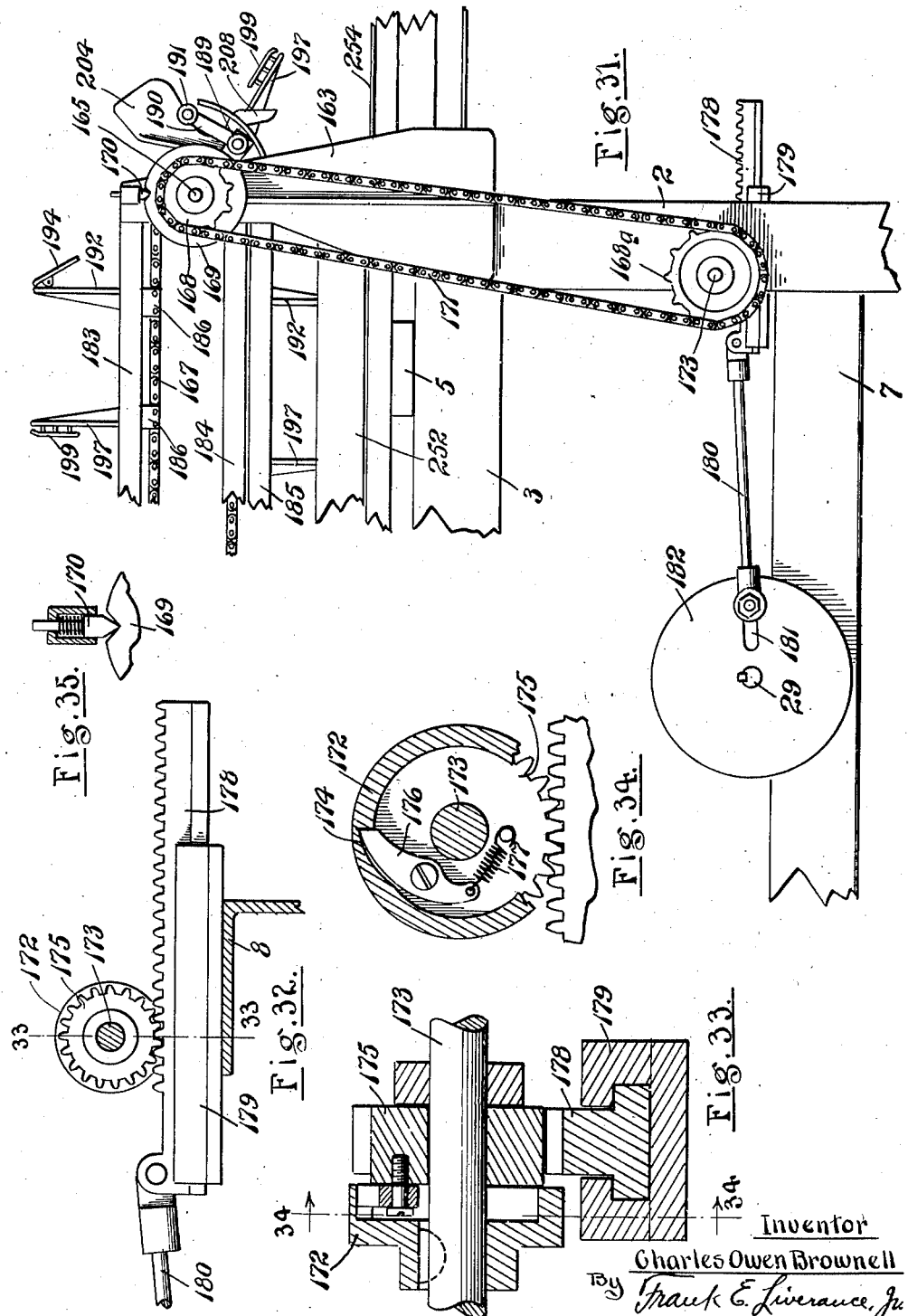

Patented Aug. 6, 1929.

1,723,967

UNITED STATES PATENT OFFICE.

CHARLES OWEN BROWNELL, OF EATON RAPIDS, MICHIGAN, ASSIGNOR, BY MESNE ASSIGNMENTS, TO THE WRAP-RITE CORPORATION, OF CHICAGO, ILLINOIS, A CORPORATION OF ILLINOIS.

BREAD-WRAPPING MACHINE.

Application filed February 21, 1925. Serial No. 10,826.

This invention relates to a bread wrapping machine. It is customary to enclose loaves of bread in wrappers for the purpose of keeping the same clean and sanitary and also to guard against evaporation whereby the bread becomes dry and stale. The loaves of bread are individually wrapped in paper, and it is an object and purpose of my invention to provide a machine wherein loaves of bread may be wrapped one after another very quickly and expeditiously so that the machine is capable of taking care of a very large quantity in a relatively short time. The machine which I have produced is designed to wrap the bread in waxed paper, the paper being of a well-known character impregnated with paraffin or similar constituent. It is a further object and purpose of the invention to provide a machine wherein the paper is very snugly wrapped around each loaf of bread, being maintained in tight and snug condition at all times during the process of wrapping and after the wrapping is complete. A still further object of my invention is to seal the wrappers on the loaves of bread by heating the waxed paper so as to cause fusing of the wax in the paper where portions of the paper come together; particularly at the ends of the paper wrapper, cool the same, and finally eject the completely wrapped and sealed loaf of bread from the machine without the necessity of handling either the bread or the paper used to wrap the same.

Many other objects and purposes than those stated will appear specifically and in detail as understanding of the invention is had from the following description, taken in connection with the accompanying drawings and, particularly, the novel method and the mechanism which is used for wrapping each loaf of bread and turning the projecting ends of the wrapper against the under side of the loaf of bread so that the weight of a loaf of bread is always acting on and serving to hold the sealed ends of the wrapper in place, in addition to the seal which has been made by fusing the wax to hold the wrapper against disengagement from a loaf of bread. In said drawings, Fig. 1 is a side elevation of the bread wrapping machine of my invention.

Fig. 2 is a fragmentary enlarged longitudinal vertical section through the front end of the machine.

Fig. 3 is a fragmentary enlarged vertical transverse section through the paper cutting knife used in the machine.

Fig. 4 is a section similar to that shown in Fig. 2 at the opposite end of the machine.

Fig. 5 is a plan view of the machine, the upper conveying mechanism for the loaves of bread being removed.

Fig. 8 is a vertical transverse section taken through the machine at the point where the loaves of bread are laterally transferred into the bread wrapping portion of the machine.

Fig. 9 is a fragmentary vertical longitudinal section illustrating the first step of wrapping the paper around a loaf of bread.

Fig. 9ª is a similar view but with the greater portion of the mechanism illustrated in Fig. 9 removed, showing a succeeding step or operation in the bread wrapping.

Fig. 10 is a view similar to Fig. 9 showing the still further progress of the bread wrapping.

Figure 11:
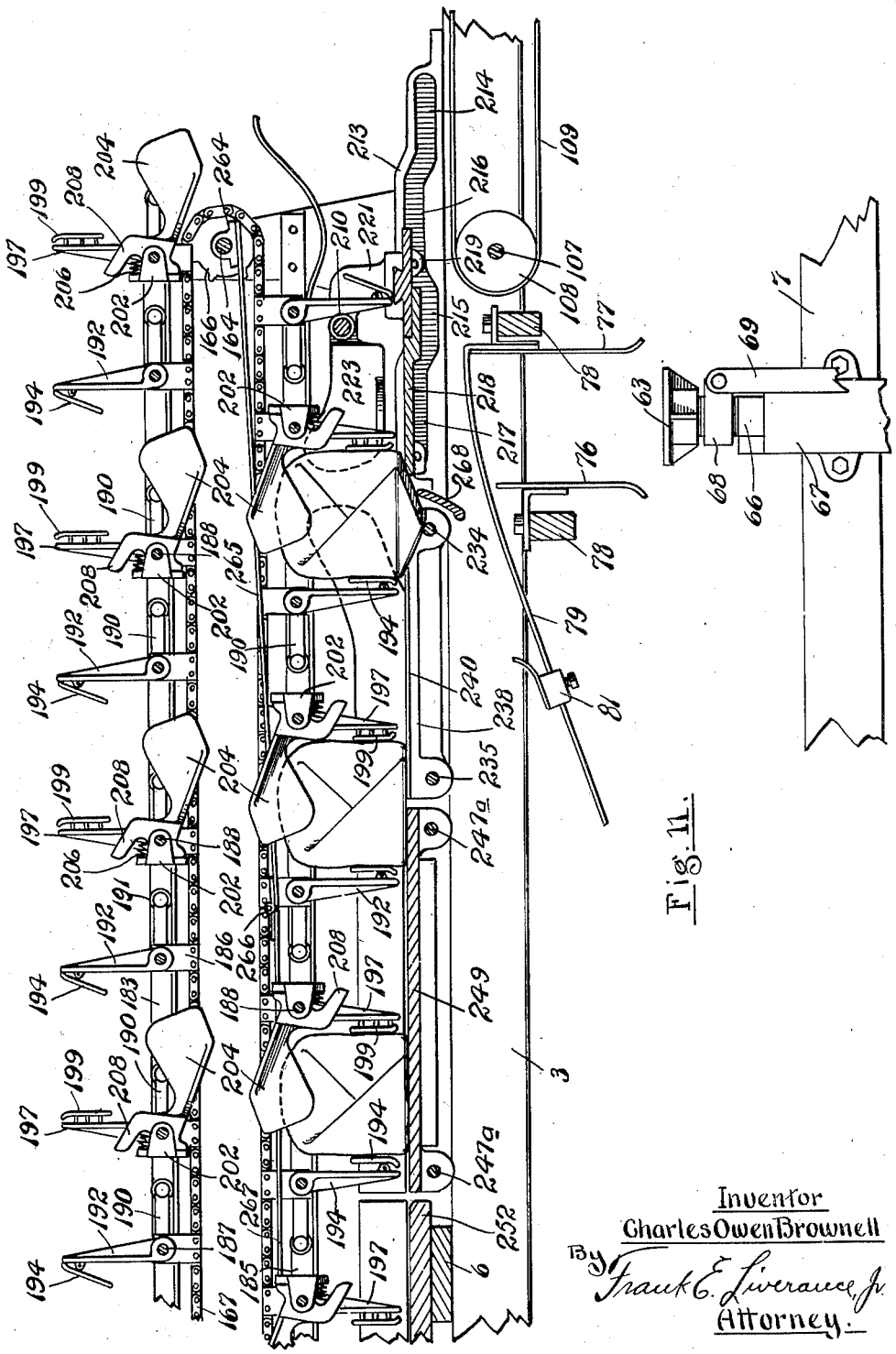

Fig. 11 is a fragmentary vertical longitudinal section similar in many respects to Figs. 9 and 10 showing the still further progress of the bread through the machine, with its complete wrapping and carrying to the heated sealing plate.

Fig. 12 is a fragmentary enlarged vertical longitudinal section through a portion of the machine and illustrating the operation of the bread elevator and the means for folding one side of the paper at each end of and underneath a loaf of bread.

Fig. 13 is a vertical section, substantially on the plane of line 13—13 of Fig. 14.

Fig. 14 is a vertical longitudinal section through the means used to carry the bread in a progressive series of steps from where it is put on the machine to the lateral conveyor which carries it to the elevator.

Fig. 15 is a view similar to Fig. 14, showing a fragment only thereof, and with the parts in another position.

Figure 16:
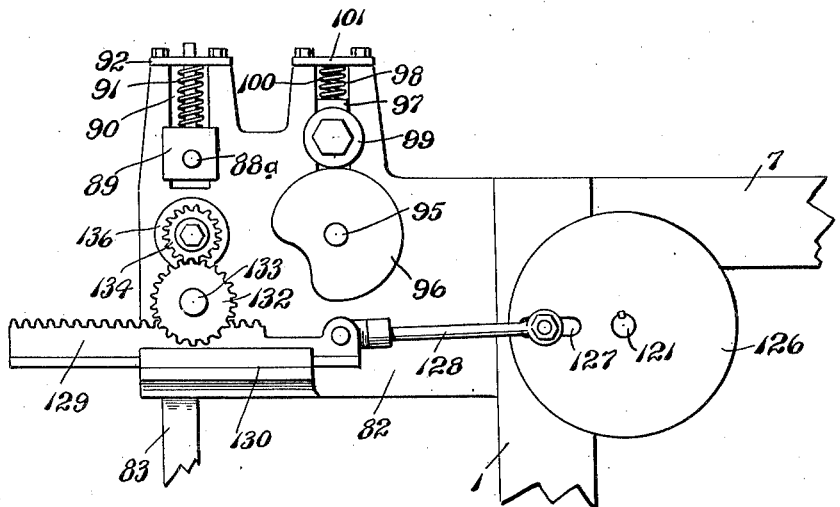

Fig. 16 is a fragmentary rear elevation of the paper feed and cutting mechanism located at the front end of the machine.

Figure 17:
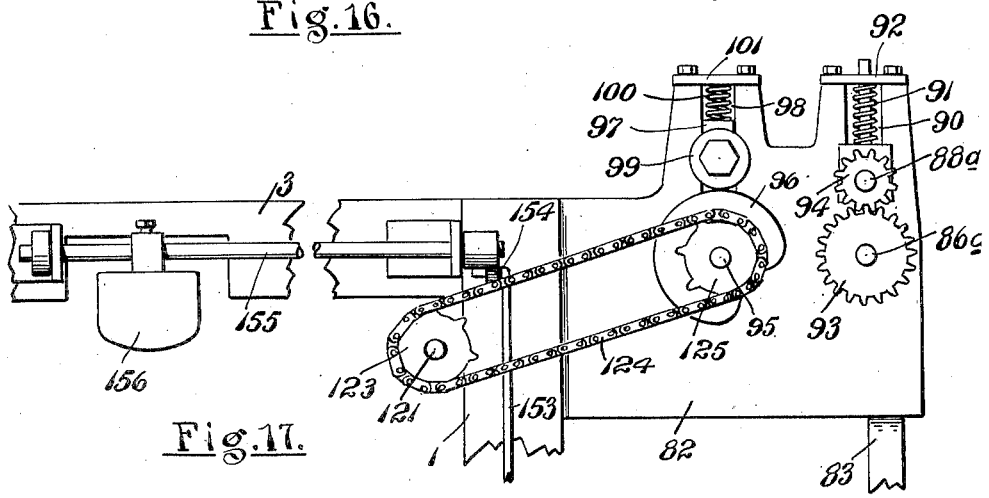

Fig. 17 is a front elevation of said mechanism.

Figure 18:
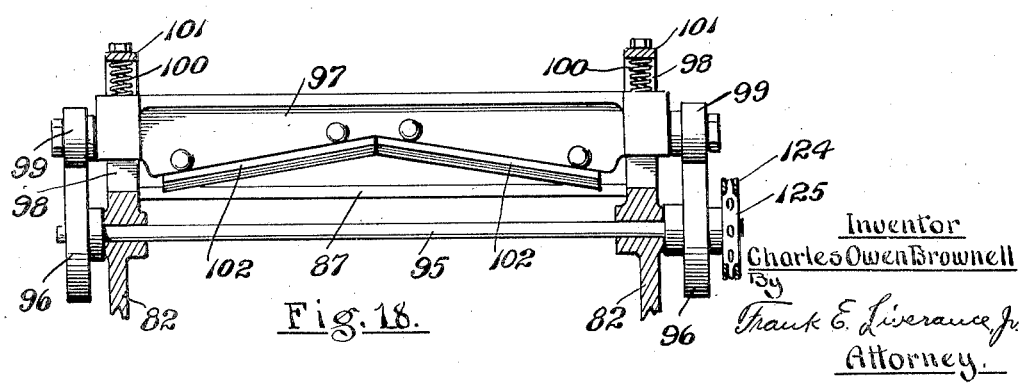

Fig. 18 is a vertical transverse section through the paper cutter operating mechanism.

Fig. 19 is a vertical section taken on the plane of line 19—19 of Fig. 20.

Fig. 20 is a fragmentary enlarged vertical transverse section through the paper feed mechanism showing the means for driving the paper feed roller.

Fig. 21 is a fragmentary enlarged vertical transverse section through the machine, illustrating mechanism for driving the paper feed and cutter device and the means used to trip and render effective said mechanism each time a loaf of bread enters the machine.

Fig. 22 is a horizontal section substantially on the plane of line 22 of Fig. 21 and looking upwardly as indicated by the arrow.

Fig. 23 is a side elevation and vertical longitudinal section of a portion of the mechanism located at the front end of the machine used for driving the paper carrying belts.

Fig. 24 is a fragmentary enlarged plan of the bread conveyor mechanism and showing the elements between which a loaf of bread, with paper over the upper side, is forced on the upward movement of the bread elevator.

Fig. 25 is a vertical section substantially on the plane of line 25—25 of Fig. 24.

Fig. 26 is a similar section on the plane of line 26—26 of Fig. 24.

Fig. 27 is a vertical section on the plane of line 27—27 of Fig. 24.

Fig. 28 is a plan view of a detail of the machine forming a part of the wrapping mechanism for the bread wherein the folded ends are guided and turned inwardly under the loaf.

Fig. 29 is a transverse vertical section therethrough showing the loaf and wrapper in one position.

Fig. 30 is a similar section showing the loaf and wrapper in a different position with the ends of the wrapper turned upwardly and inwardly.

Fig. 31 is a fragmentary rear elevation of the machine at the delivery or rear end thereof showing the mechanism for driving the conveyor in periodic step by step movements.

Fig. 32 is a detail in side elevation of the rack and pinion mechanism forming a part of the drive mechanism for the conveyor.

Fig. 33 is an enlarged fragmentary vertical section taken on the plane of line 33—33 of Fig. 32.

Fig. 34 is a vertical section on the plane of line 34—34 of Fig. 33.

Fig. 35 is a fragmentary enlarged detail of the yielding means used for stopping the conveyor and holding it in position between steps of its movement, and Figs. 36 to 40 inclusive are perspective views illustrating the various stages of wrapping a loaf performed by the machine.

Like reference characters refer to like parts in the different figures of the drawings.

Figures 6, 7:
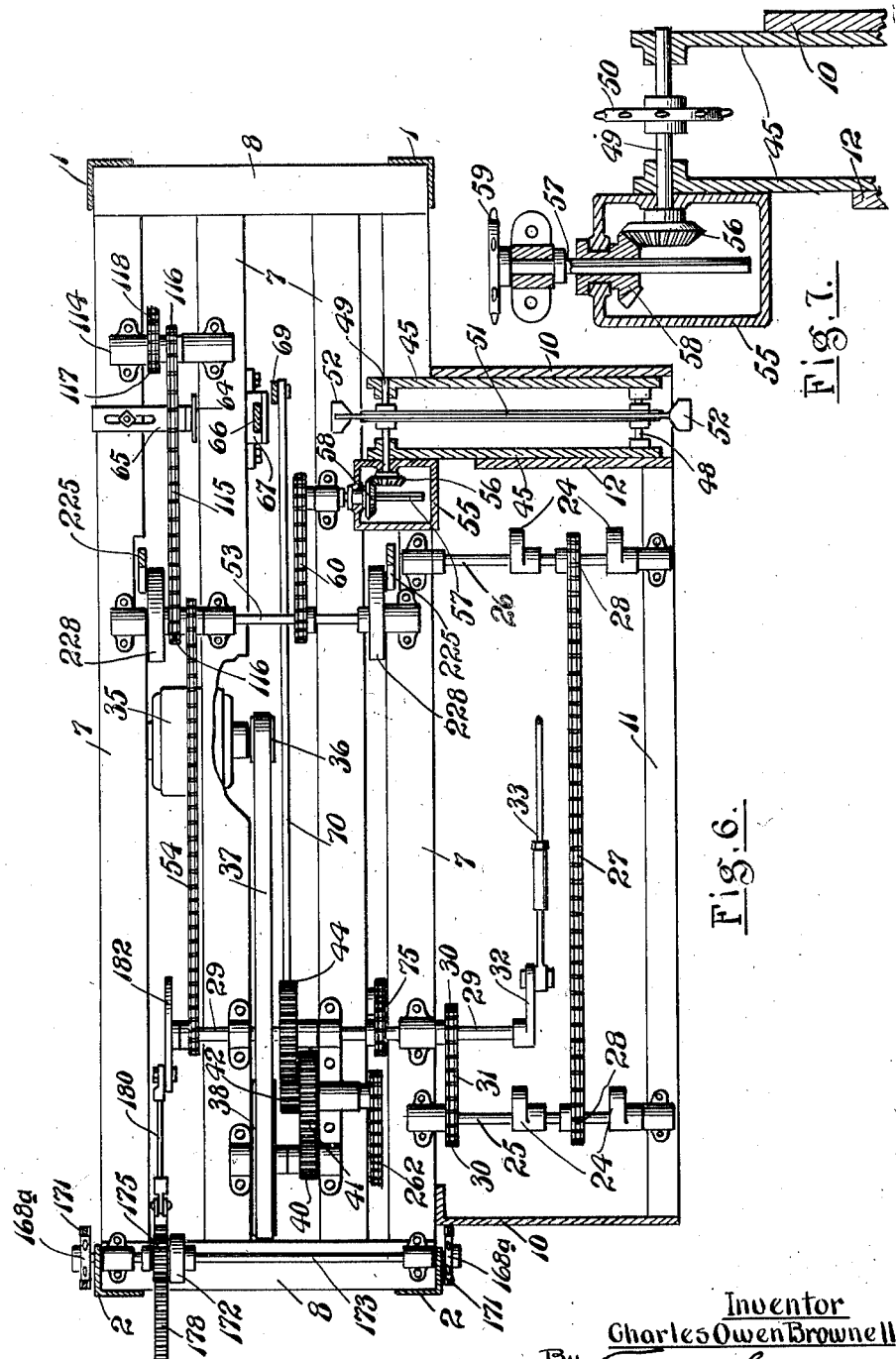
Fig. 6 is a horizontal section through the machine at a plane below the plane of movement of the bread through the machine.
Fig. 7 is a fragmentary enlarged detail of a portion of the mechanism also shown in Fig. 6, relating to the conveyor for carrying the loaves of bread individually into the machine.

In the construction of the machine, a supporting frame is provided including front end posts 1, rear end posts 2, there being two of each posts at each end of the machine spaced a distance apart and connected at their upper ends by horizontal front and rear bars 3 and 4. Adjacent the rear ends of the bars 3 and 4 a cross bar 5 is secured and a distance from said cross bar 5 a second cross bar 6 is secured, serving to space the front and rear bars 3 and 4 from each other, as best shown in Fig. 5. In a plane below the upper bars 3 and 4 a series of horizontal bars 7, four in number as shown in Fig. 6, are located and are connected together at their ends by cross bars 8 which, in turn, are connected to the posts 1 and 2. Below the bars 7 another series of bars 9 are located in a horizontal plane, paralleling the bars 7. In practice the posts 1 and bars 3, 7 and 9 are made from commercial forms of iron such as angles or the like and the same are securely fastened together to make a rigid framework for supporting the various parts of the mechanism making up the machine.

Two supporting brackets 10 are attached to the front bars 7 and 9 of the machine in spaced apart relation and project forwardly therefrom. They are reinforced and strengthened by a bar 11 disposed horizontally between them in front of and in the same plane with the bars 7. A short distance from the bracket 10 near the front end of the machine a bracket 12 is located, paralleling the upper end of said bracket 10 and being connected to and resting on the bars 11 and 7. Two spaced apart boards 13 are located between the rear bracket 10 and bracket 12, each at its outer edge, carrying an upwardly projecting guide 14 formed preferably as the vertical leg of an angle (see Fig. 13). A spring bar 15 is attached at one end to the front guide 14 (see Fig. 5) and a similar bar 16 is attached to the part 14 of the rear board 13. Both of the bars 15 and 16 extend inwardly from their respective sides 14, the bar 15 being free at its front end but the bar 16 being adjustable inwardly by means of the adjusting screw 17. The loaves of bread are placed on boards 13, bridging the space between them and in their movement to the front of the machine are guided by the guides 15 and 16, the guide 15 being yieldable for variations in the lengths of the loaves, as is evident.

In the space between the two boards 13 a third board 18 is located, at each end having a bracket 19 with depending legs attached thereto. At the lower end of each leg rollers 19ª are mounted which are received in horizontal channels 20 connected by a bar 21 (see Fig. 14). These channels are capable of up and down movements but are held against endwise movements by guide pins 22 passing through lugs formed integrally with and extending laterally from the channels 20. Each of the channels 20 at its lower side has a projection on which the roller 23 is rotatably mounted. Two shafts 25 and 26 extend across from the bar 11 to the front bar 7, being rotatably mounted in suitable bearings carried by said bars, and on these shafts cams 24 are mounted against which the rollers 23 bear. The cams, as shown in Fig. 14, are shaped so that with the rotation of shafts 25 and 26 all the channels 20 are simultaneously elevated or depressed thereby raising the board 18 to a plane above the upper sides of the boards 13 or lowering the same below said upper sides of boards 13 so that loaves of bread, indicated at L, are lifted by the board 18 above the boards 13 and are again deposited thereon when the board 18 moves to its lower position.

The shafts 25 and 26 are rotatable in unison through an endless chain 27 which passes around sprocket wheels 28 fixed to said shafts. Shaft 25 is driven from a shaft 29 which is rotatably mounted on bearings carried by certain of the horizontal bars 7 of the machine frame, (see Fig. 6) there being sprocket wheels 30 in alignment on shafts 25 and 29 around which an endless chain 31 passes. The shaft 29 at its front end is equipped with a crank arm 32 to which one end of a connecting rod 33 is pivotally connected, the opposite end of the rod being pivotally connected to a lug 34 depending from the front bracket 19 heretofore described. It is evident that with each rotation of the shaft 29, not only are shafts 25 and 26 rotated in a single revolution, but the connecting rod 33 completes a reciprocatory movement and the board 18 is moved back and forth, the rollers 19ª transversing the channel guides 20. Accordingly this combined elevation and forward movement of the board 18 serves to elevate and carry the loaves of bread forward, the loaves being deposited on the side boards 13 when the center board 18 drops below said boards 13; and the mechanism being designed so that the rearward movement of board 18 occurs after it has dropped to its lower position, the loaves of bread are not carried backward but are carried forward only, moving forward in a series of steps with each forward movement of the board 18 when at its upper position.

An electric motor 35 is supported in any suitable manner on the lower bars 9 of the frame. The shaft of this motor is equipped with a pulley 36, driving an endless belt 37 passing around a larger pulley 38 mounted on a shaft 39 which is carried in bearings supported by the bars 7 of the frame of the machine. Shaft 39 is equipped with a gear 40 in mesh with a larger gear 41 which, together with a pinion 42, is fixed on a shaft 43 mounted in bearings carried on one of the bars 7, the pinion 42 being in engagement with a relatively large gear 44 fixed to the shaft 29 heretofore described. By this mechanism it is evident that the shaft 29 is continuously driven from the motor 35 at a reduced speed.

Between the bracket 10 adjacent the front end of the machine, and the bracket 12 spaced a short distance therefrom, a fixture is mounted including vertical sides 45 and a connecting horizontal web 46 (see Figs. 6, 8 and 14). The web 46 is a short distance below the upper edges of the side 45 and two plates 47 of sheet metal extend toward each other being shaped apart at their inner edges so as to leave an open slot. Shafts 48 and 49 are mounted at the outer and inner ends, respectively, of this fixture between the sides 45 thereof. On each shaft a sprocket wheel 50 is mounted, to carry an endless chain 51 passing around the wheels from which, at two spaced apart points, arms extend of a width that the same may pass freely through the slot between the plates 47 and to which, at their outer ends, plates 52 are connected. The bread being moved along the boards 13 is eventually carried, a loaf at a time, to and deposited on the plates 47 and, with the chain 51 moving continuously, it is evident that as one of the plates 52 comes against the outer end of a loaf of bread, the same is moved inwardly into the machine.

In front of the shaft 29 a shaft 53 is mounted in bearings carried by the bars 7 (see Fig. 6). Shaft 53 is driven from shaft 29 by an endless chain 54 passing around suitable wheels on the two shafts. At the inner end of the inner side 45 of the fixture described, a hollow casting 55 is secured into which one end of the front shaft 49 passes, being equipped with a beveled gear 56 at its end within said casting. A shaft 57 is mounted in a suitable bearing carried on one of the bars 7 and extends into the housing 55 carrying a second beveled gear 58 which meshes with the gear 56. At its rear end shaft 57 carries a sprocket wheel 59, an endless chain 60 passing around said wheel and a similar wheel on the shaft 53. Inasmuch as the shaft 29 is driven continuously from the electric motor 35, it is evident that the conveyor chain 51 is likewise moved continuously whenever the motor is in operation. And any loaf of bread moved to the plates 47 is immediately carried to the rear and into the machine. In order that no loaf of bread shall be forced beyond the plates 47 a guard rail 61 is mounted on the bracket 10 by means of suitable interposed supports 62.

When a loaf is moved inwardly it is carried to and deposited on a head 63 forming the uppermost element of an elevator by means of which the loaves are elevated to a higher plane. The loaves are carried one at a time onto this head and stopped in proper position thereon by a guard plate 64 at the upper end of a suitable support 65 in turn supported on the rearmost bar 7 of the frame (see Fig. 8). The elevator head 63 is fixed at the upper end of a post 66 slidably received in a vertical guide 67 rigidly connected to certain of the bars 7 and 9 of the frame of the machine, as shown in Fig. 12. A collar 68 is adjustably mounted on the post 66 directly below head 63, and a link 69 is pivotally connected at its upper end to the collar, at its lower end having pivotal connection to the front end of a bar 70 which extends nearly to the rear end of the machine and is pivotally connected to a bracket 72 carried on one of the lower bars 9, as shown in Fig. 1. The bar 70 passes alongside of a grooved cam 71 fixed on a shaft 73 which is rotatably mounted in suitable bearings on the lower frame bars 9. The cam 71 has a groove 71$^a$ in its side in which a roller 70$^a$ on the bar 70 is received, as shown in Fig. 12, it being evident that with each revolution of the shaft 73, the elevator is raised and lowered; and a loaf of bread deposited on the elevator head 63 is lifted from its lower position at which it enters the machine to an upper position. Shaft 73 is equipped with a sprocket wheel 74 around which a chain 75 is driven from the shaft 29 passes, there being a continuous rotation of the shaft 73 whenever shaft 29 is in operation.

When the bread is moved laterally into the machine it passes between two vertical guide plates 76 and 77 (see Fig. 2) adjustably carried on cross bars 78 disposed between the front and rear bars 3 and 4 of the frame of the machine. These plates 76 and 77 may be moved toward and away from each other for different thicknesses of loaves of bread. Attached to the plate 77 are two curved bars 79 spaced apart from each other a distance greater than the length of a loaf and extending downwardly and to the rear over which the paper 80, in which the bread is to be wrapped, is fed, the bars serving as supports for the paper, which is stopped in proper position by coming against stops 81 adjustably mounted on the bars 79. This adjustment is desirable for different sizes of loaves wrapped by the machine. The paper is fed into the machine and mechanism is provided whereby whenever a loaf of bread is carried laterally into the machine to the elevator, the proper length of paper is fed and cut and thence carried to and over the supporting bars 79 so that on the elevation of the loaf the paper is carried upwardly thereby and bent downwardly to pass by each side thereof. The paper feeding and cutting mechanism will now be described.

At the front end of the machine two spaced apart plates or supports 82 are rigidly secured on the front posts 1. From these plates bars 83 depend and a roller 84 is rotatably mounted between the lower ends of the bars on which a roll of paper 85 is carried. This paper is of a suitable character for bread wrapping, being of a well-known type impregnated with paraffin or other suitable wax. The paper from the roll is carried forward over a feed roller 86 which is mounted on a shaft 86$^a$ rotatably carried by and extending between the supports 82. The paper is turned so as to pass to the rear from the feed roller and over a plate 87 located directly back of the feed roller which, at its rear edge, is provided with a beveled cutting edge for use in cutting paper as will be later described.

The paper passing over the feed roller 86 is held in contact therewith by presser rollers 88 mounted on a shaft 88$^a$ which, at its ends, is rotatably carried in blocks 89 slidably mounted in vertical slots 90 formed in the supports 82. A spring 91 under compression is located between each block 89 and an upper plate 92 which bridges the upper end of the slot 90 as shown in Figs. 2, 16 or 17, it being evident that the pressure of springs 91 at all times serves to force the rollers 88 into firm engagement with the paper held between said presser rollers and the feed roller 86. The shaft 86$^a$ at its rear end is equipped with a gear 93 and the shaft 88 at the same end with a pinion 94, the two being in mesh so that there is a positive driving connection between the feed and presser rollers.

Back of the shaft 86$^a$ a second and parallel shaft 95 is mounted extending between the supports 82. The shaft 95 at each end carries a cam 96 substantially of circular outline except at one point where a relatively deep depression is made (see Figs. 16 and 17). Above the shaft 95 a cross bar 97 is mounted, its ends being slidably received in vertical slots 98 similar to the slots 90 heretofore described and located back of said slots 90. At each end of the bar 97 a roller 99 is mounted to bear against the cams 96, being held thereagainst by springs 100 located in the slots 98 and between the ends of the bar 97 and upper plates 101 bridging the upper ends of the slots 98, as shown in Figs. 16 and 17. It is evident that with each rotation of the shaft 95, when the rollers 99 come to the depressions in the cams 96, bar 97 moves downwardly under the influence of the springs 98.

Knife blades 102 are hinged at their upper edges at 103 to the bar 97 as shown in Fig. 3. These blades are pressed against the edge of plate 87 by the springs 104 disposed between bar 97 and blades 102. In the uppermost position of the bar 97, appearing in Fig. 18, the outer ends of the blades 102 do not pass above the edge of the plate 87 so that there is no liability of said blades being forced into a position whereby the cutting edges thereof above plate 87 could come thereagainst on the downward stroke of the bar 97. The paper passes over the plate 87 and between the lowermost end portions of the cutters 102 whereby with the downward stroke of the cutter bar 97, the paper is cut inwardly from both edges toward the middle.

A shaft 105 is mounted between the supports 82 in front of shaft 95 on which rollers or wheels 106 are secured. Back of the shaft 105 and between the upper bars 3 and 4 of the frame of the machine a second shaft 107 is mounted carrying similar rollers 108 thereon. Endless belts 109 pass around the rollers 106 and 108 and over a table 110 (see Fig. 2). Spaced apart pairs of bars 111 lie above each belt 109, rods 112 passing therethrough and carrying rollers 113 located between the bars 111, the ends of the rods being received in notches in brackets 112ª at the front and rear sides of the machine. The front rods 112 may be extended through different openings of the series of openings shown in the bars 111 (Fig. 2), and the ends of the rods may be located in different notches in the brackets 112ª thereby permitting a range of adjustment sufficient to cover the different lengths of paper which are cut for different sizes of loaves of bread wrapped. This construction consisting of the bars 111, rod 112 and rollers 113 is a pressure construction for holding the paper in contact with the conveyor belts 109 so as to carry it into position over the loaf and to stops 81, it being designed that when the proper length of paper is in position over a loaf and against the stops 81 the end of the paper shall have passed beyond the rear rollers 113, this appearing best in Fig. 2.

A shaft 114 is mounted in bearings carried by the two of the bars 7 of the supporting frame and is driven from shaft 53 by a chain 115 which passes around suitable sprocket wheels 116 on the two shafts. Said shaft 114 is equipped with a second sprocket wheel 117 for driving an endless chain 118, the same extending upwardly and forwardly to and around a wheel 119 which, together with a considerably larger sprocket wheel 120, is loosely mounted on a shaft 121 rotatably mounted in hangers 122 depending from the upper horizontal bars 3 and 4 of the frame (see Fig. 2). The wheels 119 and 120 are pinned together so as to rotate in unison. At its front end shaft 121 is equipped with a sprocket wheel 123 to drive a chain 124 which passes around a similar sprocket wheel 125 fixed to the front end of the shaft 95 heretofore described. Shaft 121 at its rear end carries a disk 126 (see Fig. 16) keyed thereto in which a lateral slot 127 is cut for the adjustable connection of one end of a connecting rod 128, the opposite end of the rod being pivotally connected to a rack bar 129 mounted above and held on a suitable horizontal guide 130 formed at the lower edge of the rear supporting member 82 of the paper feed and cutting mechanism. The rack 129 is in mesh with a pinion 131 which is pinned to a larger gear 132, both pinion and gear having a loose mounting on a stud shaft 33 carried by said rear support 82. The gear 132 in turn meshes with a pinion 134 located above it loosely mounted on the rear end of the shaft 86ª of the paper feed roller previously described. At its inner end the pinion 134 is formed with a ratchet-wheel 135 which lies alongside of a disk 136 keyed to said shaft 86ª. The disk carries two spring actuated pawls 137 which are held against the ratchet wheel. It is evident that on rotation of shaft 121 the rack 129 is reciprocated, turning the ratchet-wheel 135. In one direction of movement of the rack the ratchet-wheel engages the pawls 137 turning the disk 136 and the shaft 86ª to which it is keyed, but in the opposite direction of movement the ratchet-wheel slips past said pawls and there is no movement of the feed roller 86 on said shaft 86ª. Accordingly the feed roller is rotated in one direction only and in the direction such that the paper is fed toward and into the machine.

The sprocket wheel 120, previously mentioned, at its hub is thickened in which portion notches 138 are formed (see Fig. 21). In practice three of these notches are formed though the number is not particularly essential. A heavy collar 139 with a groove 140 therein is keyed to the shaft 121 alongside the notched hub of the wheel 120. A rod 141 formed with an out-turned end 142 is slidably mounted through the collar 139 and is spring actuated by a spring 143, the tendency of which is to force the end of the rod 141 into a recess 138 whenever said rod is free to move. Directly below the collar 139 a vertical support 144 is mounted, the same being attached to one of the horizontal bars 7 of the machine frame. A vertical guide 145 is fixed to the support 144 and carries a trip bar 146 which, normally, is moved upwardly by a spring 147 into the groove 140 of collar 139 engaging with the end 142 of rod 141 so as to hold the same away from the wheel 120. Whenever the trip bar 146 is pulled downwardly so as to disengage from the end 142 it is evident that the rod 141 moves into a recess 138 of the wheel 120 and shaft 121 is then rotated. The upper end of the trip bar 146 is beveled as indicated in Fig. 22, and with the release of the trip bar and movement back to upper position it enters groove 140, the rotation of the collar 139 bringing said end 142 of rod 141 against this beveled edge of the trip bar so that the rod 141 is automatically withdrawn from the recess 138 in which it has been located stopping any further rotation of the shaft 121. This is a common and well-known type of automatic trip used with punch presses for permitting one revolution and one only of a rotating shaft.

A rod 148 is located transversely of the machine being supported in the support 144 and a second support 149 carried on the front horizontal bar 7 of the machine frame, as shown in Fig. 21. The rod 148 carries an arm 150 below the trip bar 146 there being a strong coiled spring 151, stronger than the spring 147, disposed between the lower end of the trip bar and the arm 150. At its front end rod 148 is equipped with a second arm 152 to which the lower end of a link bar 153 is connected. The upper end of the bar 153 is connected to the outer end of an arm 154 fixed at one end of a rock shaft 155, mounted near the front end of the machine and in front of the horizontal bar 3 of the frame (see Fig. 17). A plate 156 is attached to and depends from the rock shaft 155 being disposed in the path of movement of a loaf of bread when it is carried by the conveyor 51 to the elevator. It is evident that the end of the loaf striking against said plate 156 trips the mechanism so that the shaft 121 is rotated one complete revolution whenever a loaf of bread is carried to the elevator. And at no other time does the shaft turn. Accordingly the disk 126, which operates the feed roller for the paper, and the sprocket wheel 123, which operates the mechanism for releasing the paper cutter, never come into play except when a loaf is carried into the machine and rocks the rock shaft 155 as it passes.

The wheel 120, which rotates continuously, drives a chain 157 in turn passing aroung a sprocket wheel 158 on a shaft 159 mounted adjacent the front end and near the lower side of the rear bar 4 of the machine frame. Said shaft also carries a gear 160 which engages with a like gear 161 on the shaft 107 thereby driving the paper conveyor belts 109 continuously.

From the foregoing it will be evident that whenever a loaf of bread is carried to the elevator with a consequent operation of the trip plate 156 and a single rotation of the shaft 121, the disk 126 at the end of shaft 121 makes one rotation reciprocating rack bar 129 and thereby rotating the paper feed roll 86 in one direction so as to move the paper onto the paper conveyor belts 109 and under the first rollers 113. There is also an operation of the cutting knife as the shaft 95 controlling the same is also turned through one revolution by sprocket wheel 123 and chain 124. Accordingly, paper is fed and cut to the proper length only when a loaf of bread is moved to the elevator. This insures that there shall be no waste of paper or any feeding of paper except when it is needed.

Two vertical supports 162 are connected to the horizontal bars 3 and 4 near their front ends. Similar supports 163 are connected to the rear posts 2 at the rear end of the machine. Shafts 164 and 165 are rotatably mounted in suitable bearings on and disposed between the supports 162 and 163, respectively. The shafts carry sprocket wheels 166 (see Fig. 2) and endless conveyor chains 167 having horizontal upper and lower runs are disposed around and between said sprocket wheels. This conveyor is designed to move the bread through the machine in a series of periodic step by step movements. The mechanism for driving the chain is located at the rear end of the machine (see Fig. 31). It includes a sprocket wheel 168 attached to the rear shaft 165 with which a disk or drum 169 is connected, the same also being located around the shaft 165 and having a notch in one side with which a spring operated detent 170 (see Fig. 35) is adapted to engage. An endless chain 171 passes around the wheel 168 and also around a sprocket wheel 168ª fixed on shaft 173 which is mounted at the rear end of the machine a short distance above the plane of the bars 7. The opposite end of the shafts 165 and 173 are likewise equipped with sprocket wheels 168 and 168ª and a second chain 171 passes around said sprocket wheels so as to equalize the drive of shaft 165 from shaft 173. Between the ends of shaft 173, a drum 172, recessed at one side, is located and keyed to the shaft, the recess being of cylindrical form except at one point where a notch 174 is cut, as shown in Fig. 34. A gear 175 is loosely mounted on shaft 173 alongside drum 172 and carries a dog 176 pivotally mounted thereon and acted upon by the spring 177 to cause the free end of the dog to bear against the inner curved surface of the recess in the drum and enter the notch 171 when said notch and dog come into conjunction with each other. Gear 175 is in mesh with a rack 178 which is mounted for slidable movement in a suitable guide 179 carried on and above the rear cross bar 8 of the frame. A connecting rod 180 is attached at one end to the front end of the rack bar and at its opposite end has an adjustable connection at the slot 181 in a disk 182 fixed to the rear end of shaft 29. It is evident from this construction that as shaft 29 is driven continuously rack bar 178 is continuously reciprocated. With the movement of the rack bar in a backward direction the dog 176 engaged in notch 174 turns drum 172 and the shaft 173 with a consequent movement of the conveyor chain 167; but when the rack bar is moved in the opposite direction the pawl 176 disengages from notch 174 and moves freely around the inner sides of the recess of drum 172 and there is no movement of the conveyor 167 in the opposite direction but a pause between the steps of movement of the chain in the one direction in which it can be moved.

Two angle bars 183 having their horizontal flanges extending inwardly are disposed between the upper ends of the vertical supports 162 and 163. Below each of said bars 183 two angle bars 184 and 185 are located and attached to said supports (see Fig. 8) also having the horizontal legs thereof extending inwardly and parallel to and spaced apart from each other. The chains 167, at spaced apart intervals, are provided with outwardly extending blocks 186 through which shafts 187 and 188 pass, said shafts being located alternately in the length of the conveyor chain and cooperating in pairs. Rollers 189 are mounted at the ends of each shaft to traverse the upper sides of the horizontal legs of the bars 183 and 185 and the curved extension 185$^a$ at the ends of bars 185, said inwardly extending legs of the bars 184 lying above the rollers in the lower run of the chain. Arms 190 are attached at each end of each shaft extending a short distance and carrying rollers 191 at their free ends which traverse the same paths of movement as the rollers 189. These arms fixed to the shafts 187 and 188 when passing between the lower angle bars 184 and 185 hold the shafts 187 and 188 against any rotary movement.

On each of the shafts 187 two spaced apart plates 192 are mounted, each having spaced apart sleeves 193 formed integral therewith through which the shaft 187 passes, suitable set screws passing through the sleeves to secure plates 192 in fixed relation to the shaft. These plates 192 extend upwardly from the shafts in the upper run of the conveyor and downwardly therefrom in the lower run thereof. At the free end of each plate 192 a narrower plate 194 is located, being pivotally connected to plate 192 through a rod 195 passing through ears extending from the two plates as shown in Figs. 24 and 26. A spring 196 is disposed around the rod and between the two plates whereby plate 194 in the lower run of the conveyor at its upper edge is moved away from the fixed plate 192. Said spring however yields under pressure and the plate 194 may be turned toward plate 192.

On the shaft 188 next to its cooperating shaft 187 other plates 197 similar to plates 192 are secured, being formed with spaced apart sleeves 198 through which the shaft 188 passes, the same method of permanently connecting the sleeves to the shaft being used. These plates 197 also extend downwardly from their respective shafts 198 in the lower run of the conveyor, and near the lower portion of each plate 197 a shorter plate 199 is adjustably secured by means of screws 200 and a locking screw 201, as best shown in Fig. 25. The plates 199 may be adjusted toward or away from plates 197 but when once positioned do not have any movement with respect to the plates 197 to which they are attached. The shafts 187 and 188 are disposed in pairs and the plates 192 and 197 on the respective shafts are substantially parallel while the auxiliary members 194 and 199 are located on adjacent sides of the plates. A loaf of bread elevated by the elevator to pass between plates 192 and 197 is pressed against the plates 199 and the plates 194 are turned to substantially vertical position bearing with spring pressure against a side of the loaf and moving it into contact with the plates 199 carried on the adjacent shaft 188.

In addition to the plates 197, each shaft 188 carries two members 202 which are fixed to the shaft by a set screw but can be adjusted to different positions thereon. Each member is of substantially U-shape the shaft 188 passing through the legs of the U. Between the legs of each of the members 202 a sleeve 203 is mounted on the shaft, extending from which is an arm 204 flared outwardly and considerably widened at its free end portion as shown in Fig. 27. A web 205 is integral with and extends from the sleeve 203, a spring 206 being disposed between the web and back of the member 202, the tendency of which is to elevate arm 204 until finger 207 at the upper side of sleeve 203 comes into engagement with the upper edge portion of the member 202. At its lower side and extending downwardly from the web 205 is a second finger 208 having an inclined lower edge. With the movement of the lower run of the conveyor chain from the front of the machine toward the read end, said edge of the finger 208 on each of the members comes into engagement with a roller 210 mounted at the inner end of a rod 209 which in turn is fixed to each of the front supports 162. This causes the widened and flared end of arm 204 to be moved downwardly at a point directly over the elevator or where a loaf of bread is carried upwardly between members 194 and 199, one of the arms 204 being located at each end of the loaf carried on the elevator. As a result the paper 80, which has been elevated with the loaf on the upward movement of the elevator, has its end portions engaged by the lower edges of arms 204 and bent downwardly making the recesses 211 in the paper at each end of the plate; or, in effect, there is a beginning of the wrapping operation, the first step of which is to press the paper downwardly at each end of the bread as indicated at 211 in Fig. 36. Prior to this the upward movement of the elevator bringing the upper side of a loaf of bread against the paper 80 has carried the paper with the bread upwardly and between plates 194 and 199 thereby causing the paper to be bent tightly over the bread and downwardly at each side thereof with terminal portions 212 extending at each side below the lower side of the loaf.

Adjacent the front end of the machine and at each side thereof above the upper frame bars 3 and 4, a slotted guide bar 213 is permanently secured. These bars are formed with elongated slots having two lower portions 214 and 215 and two elevated portions 216 and 217 (see Fig. 12). The lower or depressed portion 215 is located between the two raised portions 216 and 217. A plate formed of two parts 218 and 218ª, secured together and made in this manner for convenience of manufacture, is located horizontally between the guides 213 being equipped with rollers 219 which enter the slots in said guides. When the rollers are in the depressions 214 and 215 the plate is at a lower level than when the rollers have been moved upwardly to the raised portions 216 and 217. The part 218ª of the plate is formed with a dove-tail projection or guide 220 at each end thereof for the adjustable connection of an arm 221 to each of said projections, each arm having a foot 222 with a dove-tail groove to receive the guide. The arms extend upwardly for a short distance and are then turned toward the rear terminating in widened sections 223, which extend substantially to the rear edge of plate 218.

Two links 224 are connected with the plate 218 extending to the rear therefrom and having connection at their rear ends with the upper ends of two levers 225 which extend downwardly and are pivotally connected at 226 at their lower ends to horizontal bars 9 of the frame of the machine.

Each lever 225 between its ends has a short rearward projection on which a roller 227 is mounted being received within a groove 228ª of a cam 228 keyed to the continuously rotating shaft 53. There are two of these cams to operate the two levers 225 and the cams are shaped so that with each rotation of the shaft 53 the plate 218 is moved from its front position to the rear and back again; and it is evident that in this process of movement it is elevated a short distance above the plane of its front position.

By reference to Fig. 12 of the drawing it will be noted that the cam 71 which operates the elevator is formed with a portion in the arc of a circle, denoted as a "dwell", the center of which is coincident with the axis of shaft 73, so that when the elevator has reached a certain predetermined upper position it is held in such position for a short period before it starts to move back to lower position. While thus held the cams 228 are so located that the plate 218 has been moved to a position substantially that shown in Fig. 9ª or with the rear edge of the plate extending slightly under the loaf which is on the elevator. Cams 228 are likewise formed with a short arc of a circle or dwell the center of which is coincident with the axis of the shaft 53 whereby there is a slightly momentary pause in the movement of the plate 218 toward the elevator. When this pause or dwell for the plate 218 begins, the pause or dwell of the elevator is at an end whereby during the time that the plate is not moving the elevator drops downwardly out of the way of the plate. When the elevator has thus moved downwardly and out of the way of movement of the plate the rearward movement of the plate continues coupled with an elevation from its lower position to the slightly upper position. The reason that the plate is moved forward to a position substantially like that shown in Fig. 9ª is to prevent any likelihood of the loaf of bread dropping when the elevator support therefor is removed and this is accomplished very simply and effectively by projecting the rear edge of the plate 218 slightly under the loaf.

With the continuing movement of the plate 218 and of the members attached thereto, after the elevator has been lowered, the depending end 212 of the paper 80 in the front side of the loaf is folded upwardly against the bottom of the loaf. At the same time the elevation of the plate 218 causes this paper to be drawn tightly against the loaf. Simultaneously with the folding of one side 212 of the paper under the loaf the two portions 223 of arms 221 pass along the ends of the loaf and fold the end portions of the paper inwardly around the parts 204 as indicated at 229 in Fig. 37, the paper at each end of the loaf and at one side thereof being folded inwardly as shown against the end of the bread while a second portion extends outwardly above and paralleling the horizontal portion 212 which has been folded under and against the bottom of the loaf. The paper being creased on the lines 231 and 232 during this operation. This folding operation of the paper takes place during a time when the conveyor is at rest. Immediately when this has been accomplished the chains 167 are operated to carry the lower run of the conveyor toward the rear end of the machine coupled with a simultaneous movement of the plate 218 back to its original position, the loaf passing from the plate 218, and the end folders 223 to a device which automatically completes the folding of the paper and wrapping of the loaf as the loaf is moved in the succeeding step of movement of the conveyor. And with this movement of the conveyor, rollers 210 are left and the parts 204 permitted to elevate to their normal position.

At both the front and rear sides of the machine, supports 233 are fixed to the frame bars 3 and 4 back of the elevator space (see Fig. 5) between which spaced apart cross rods 234 and 235 are carried. These bars serve as a support for a stationary folding guide member which accomplishes the remaining folding operations of the paper around the loaf and its complete wrapping. This member includes two parts 236 located above and mounted on the rod 235, the same extending forwardly and terminating in vertical end folding members 237 located at the rear side of one member 236 and the front side of the other. The members 236 are cut away at their front portions, said vertical members 237 being curved upwardly and away from said rods as shown in Fig. 1. Between the members 236 other members 238 and a center member 239 are located and a plate 240 of sheet metal covers said members and extends backwardly over the central portions of the members 236 being permanently secured in place by screws. The edges of the plate are spaced a short distance from the vertical parts 237 and extend outwardly beyond the sides of the members 238 forming enlargements 242 which lie more or less above the concaved recessed guide portions 241 formed in the upper sides and at the front of each of the members 236. The purpose of the construction will now be described.

Figures 36, 37:
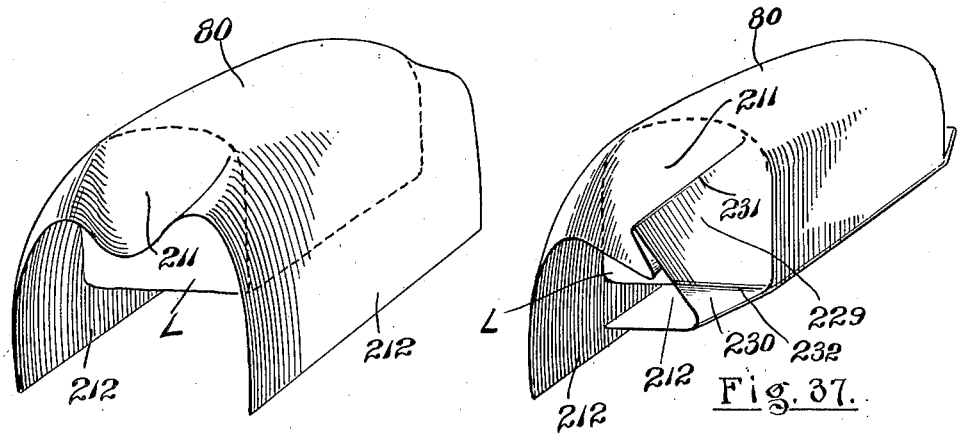
Figures 38, 39:
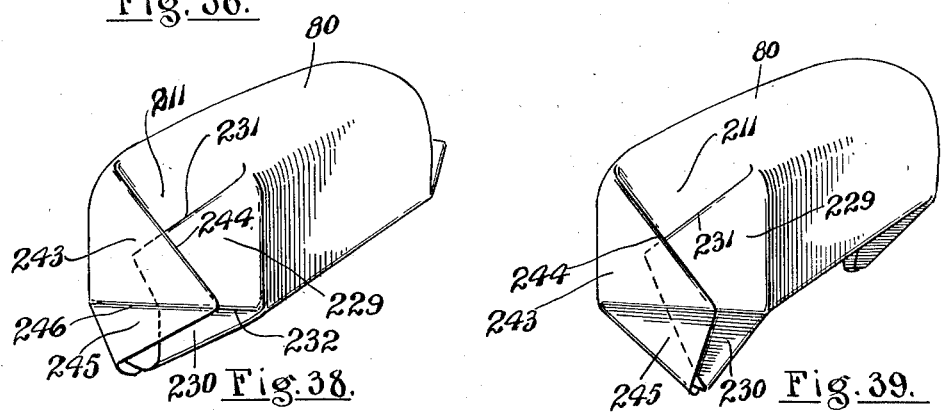
Figure 40:
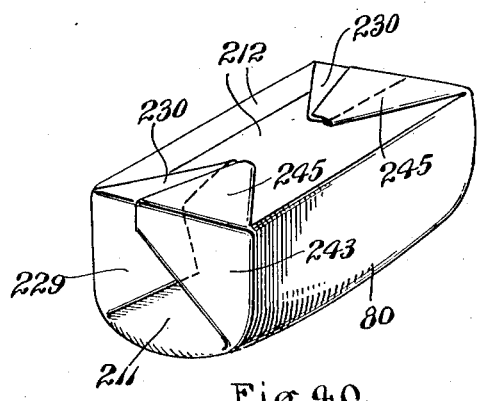

With the movement of the loaf partly wrapped, as shown in Fig. 37, over the plate 240 the other depending side 212 of the wrapper 80 is turned upwardly and against the bottom of the loaf overlapping the first portion 212 first folded underneath the loaf and the end portion of the wrapper is turned inwardly, as indicated at 243 in Fig. 38, against each end of the loaf, overlapping the other similar portion 229, the remainder of the folding being indicated at 244. This occurs by reason of the depending side portion 212 being drawn over the edges of the members 238 and 239 and also by reason of the projecting end portions of the wrapper coming against the vertical folders 237 at the same time the under edges of said folders 237 serve to crease the paper along the line 246 in alignment with the crease 232 (see Fig. 38) thereby folding a section 245 over the prior folded section 230. With the continued movement of the loaf of bread wrapped and with the projecting folded ends extending outwardly, as shown in Fig. 38, said ends are turned downwardly and thence under the loaf by reason of the curved edges and concave shapes of the members 236, shown at 241, whereby when the wrapped loaf reaches this portion of the device, the projecting ends of the wrapper are turned under and against the bottom wrappings of the loaf. This is shown in Fig. 40 and the bread is fully wrapped and ready for delivery from the machine as soon as sealed.

The movement from the first position of the loaf in the machine to its second position, shown in Fig. 2, completes the wrapping except for the final step, that of turning the folded ends underneath the wrapped loaf. With the next succeeding movement of the conveyor the wrapped loaf is carried onto a heated plate which lies adjacent the stationary folding apparatus just described. Two supporting bars 247 are attached to the upper sides of the frame bars 3 and 4. Rods 247$^a$ extend transversely of the machine between said bars. Other bars 248 are mounted on the rods 247$^a$ between which the heated plate 249 is located, being adjustably mounted thereon by threaded rods 250 extending from the sides of the head plate from the lugs 251 which project upwardly from bars 248. The plate 249 may be electrically heated or otherwise in any suitable manner. The wrapped loaf passing to such plate comes to a stop on the plate and the heat given off therefrom melts the wax of the paper closely adjacent the plate or on the under folded portions. As a result the wax on contacting portions of the paper fuses and completes a secure sealing of the wrapper.

With the next succeeding step of movement of the conveyor the wrapped and sealed loaf is carried to the cooling table of the machine shown at 252 and lying in alignment with the heating plate 249. The cooling table is adjustably mounted by means of brackets 253 on the cross bars 5 and 6 of the machine frame. Said table is shown with a plurality of slots therein for the entrance of air against the under side of the loaf. The cooling table is long enough that the wrapped and sealed loaf is located thereon for at least two periods of intermisison in the movement of the conveyor, allowing time for the melted and fused wax to cool before the wrapped loaf is delivered from the machine, it being delivered at the rear end of the cooling table to conveyor belts 254. Of course the specific structure of the cooling table is subject to wide variations and that shown is merely one form of a table having a slotted bottom for the contact of cold air against the under side of the sealed wrapper; and if necessary a fan for blowing air through the openings in the table can be applied.

The belts 254 are located around pulleys 255 fixed on a shaft 256 mounted horizontally at the rear end of the machine (see Fig. 4). Extending outwardly from the rear end of the machine is a horizontal supporting frame 257 which is held rigid by a diagonal brace 258, there being a second shaft 259 mounted at the outer end of the frame in the same plane with shaft 256. Pulleys 260 on shaft 259 align with the pulleys 255, the belts 254 passing around both the pulleys 255 and 259. A sprocket wheel 261 is attached to the shaft 256 and is driven by a chain 262 passing around another sprocket wheel 263 fixed on shaft 43. It is evident that whenever the motor 35 is running, belts 254 operate continuously so that on the delivery of the wrapped and sealed loaves of bread to said belts 254 the bread is carried outwardly away from the machine and may be delivered to any suitable receptacle or taken from the belts in any preferred manner.

On each of the shafts 164 and 165 a member 264 is loosely mounted (see Fig. 4) to which a flat elongated strip of metal 265 is connected, the same extending inwardly from each end of the machine and also downwardly at a slight angle being hingedly connected at its end, as indicated at 266, to an intermediate similar flat strip or bar of metal 267. In the passage of the loaves of bread through the machine the intermediate strip 267 bears against the upper sides of the loaves or the wrapper thereon holding the wrapper against slipping so that the wrapping of the bread is accomplished with a relatively tight and snug drawing of the wrapper against the loaves, and also holding the loaves after wrapping against the heating plate.

In the operation of the above described machine the loaves of bread are placed on what may be termed the receiving table, comprising the spaced apart boards 13 with the movable board 18 between, which is periodically elevated and moved forward and then lowered and moved backward so that the loaves of bread are carried forward in periodic step by step movements to the front end of the board 18 in its foremost position. The front loaf is then moved forward by the pressure of the loaves behind against it so that in succession the loaves are passed to and above the plates 47 resting thereon, being immediately transferred to the elevator by the chain 50 and the plates 52 which engage against the outer ends of the loaves and carry them one at a time to the elevator.

When a loaf has been carried to the elevator and is resting on the head 63 rotation of shaft 73 and the cam 71, keyed on said shaft, causes an elevation of the elevator followed after a short stopping or dwell by its return to lower position for the reception of the succeeding loaf. In the meantime the passage of the loaf to the elevator rocks shaft 155 on account of the engagement of the loaf in passing with the trip plate 156, serving to connect the continuously rotating wheel 120 with collar 139 so as to rotate shaft 121 through one revolution, the shaft stopping at the completion of a single revolution as has been described. As a result, the proper length of paper is fed into the machine and cut off coming against the stops 81 on bars 79 so that on the elevation of the loaf which has been carried into the machine the paper is carried upward between two of the pairs of plates 194 and 199 causing the paper to draw down and wrap against the top and opposite sides of the loaf. At the same time the end portions of the paper projecting outwardly from the upper side or top of the loaf are engaged by the flattened arms 204 which have been depressed to their lowermost position by reason of the fingers 208 riding on the rollers 210. The position of the loaf before elevation with the paper over it and with said arms 204 depressed is shown in Fig. 2 and immediately after elevation in Fig. 9.

With the loaf in this upper position and with the elevator momentarily pausing before beginning its downward movement, the cam 228 on shaft 53, which is continuously rotating, operates to move the plate 218 with the end folder member 223 thereon to the position shown in Fig. 9ª, that is, with the edge of the plate slightly projected underneath the loaf but with sufficient space left for the elevator to move to lower position. The elevator as previously described begins its downward movement and for a short portion of the downward movement plate 218 remains stationary because of the dwell formed on cam 228 (see Fig. 12) ; but when the elevator has moved a short distance downwardly the movement of the plate 218 continues coupled with an elevation of said plate, thereby turning one of the depending sides of the paper, used to wrap the loaf, under the lower side of the loaf and causing the paper to bind snugly against the loaf (see Fig. 10), due to the elevation of the plate 218 coupled with the pressure exerted by the pressure member 267 which bears against the wrapper at the upper side of the loaf. At the same time the movement of the members 223 across the ends of the loaf and over parts 204 partially folds the wrapper to the position shown in Fig. 37.

During these operations the conveyor, which carries the plates 192 and 197 to which plates 194 and 199 are attached, is at rest but as soon as this partial folding operation has been completed, the conveyor is started in motion making a step of its movement through the construction shown in Figs. 31 to 34 inclusive and which has been fully described. This causes the loaf partially wrapped to move from the position shown in Fig. 10 to that shown in Fig. 2, Fig. 11 showing an intermediate position of the loaf as it is moved from the position shown in Fig. 10 to that shown in Fig. 2. It will be noted that an upwardly projecting and curved plate or bar 268 is located transversely of the machine directly in front of the members 236, 238 and 239 over which the depending unfolded side of the wrapper passes, said plate serving, as shown in Fig. 11, to hold the depending side which has been folded under the lower side of the loaf from dropping back to unfolded position. The movement of the loaf and wrapper from the position shown in Fig. 10 to that shown in Fig. 2 brings the outwardly projecting ends of the wrapper into engagement with the end folding members 237 simultaneously with or shortly after the turning upwardly of the remaining depending side 212, whereby when the loaf has reached the position shown in Fig. 11 the loaf is completely wrapped but the folded ends thereof project outwardly, as shown in Fig. 38. With the continuation of the conveyor movement said ends are engaged between the under edges of the parts 237 and the curved edges of the parts 236 and 242 progressively bending said ends downwardly and then upwardly against the under sides of the wrapped loaf, the wrapping being completed just before the loaf passes to the heating plate 249. The conveyor pauses again while the wrapped loaf is on the heating plate allowing time for the wax, with which the paper wrapper is impregnated, to melt and fuse together, and in the succeeding steps of the conveyor the wrapped and sealed loaves are carried to the cooling table 252, the fused wax being cooled and hardened during the passing over and the stops made by the wrapped loaf on the cooling plate.

It is evident that several loaves in more or less complete wrapped condition are in the machine at the same time so long as the supply of bread to the machine is maintained. It is also evident that should the supply of bread to the table, formed of the boards 13 and 18, not be maintained whereby loaves are not fed to the elevator, though the elevator continues its reciprocation and the conveyor for the loaves through the machine continues its periodic step by step movement, no paper is fed or cut, this occurring only when a loaf is carried into the machine so as to actuate the rock shaft 155. It is also clear that the wrapping of the loaf is performed very quickly and expeditiously, that the members 204, which serve to bend the paper down from the upper side of the loaf against the ends thereof, are automatically released and move out of the way after their function has been performed, and that the folding of the wrapper accomplished at opposite sides of the loaf first by movement of the member 218 and the attached end folders 223 while the loaf is held stationary at the time these parts act, and the completion of the folding by the movement of the loaf through the machine past the stationary members 236, 237, 239 and 240, provides a very novel and exceptionally effective manner of wrapping the wrapper snugly against the loaf and turning the folded ends downwardly and underneath the lower side thereof. This construction wraps a loaf with the projecting ends sealed in place underneath said loaf. This is a very desirable feature of the invention due to the fact that the wrapped bread in normal position bears with its weight against said under-turned folded ends of the wrapper, thereby helping to maintain the seal and furthermore holding the wrapper in place even though the seal should become broken.

The construction described is of a practical and thoroughly tested machine which operates as described to wrap bread and seal the wrapper in place on the bread. Many changes in the detail of construction may be resorted to without in any way departing from the invention. The invention is defined in the appended claims and is to be considered as comprehensive of all forms or variations of structure which may depart from the specific detailed structure shown and described but which come within the scope of said claims.

I claim:

1. In a bread wrapping machine, a support, a conveying mechanism on the support, means for carrying loaves into said conveying mechanism at periodic intervals, means for positioning a wrapper in which the loaf is to be wrapped in the path of movement of the top of the loaf combined with means between which the loaf and wrapper pass for turning the wrapper to wrap against opposite sides of the loaf, means carried by the conveyor against which the wrapper is brought for forcing the upper projecting portions of the wrapper against the end of the loaf, means for moving said conveyor predetermined distances at periodic intervals, means for folding one side of the wrapper and the projecting ends of the wrapper at said side against the bottom and ends of the loaf, respectively, while the conveyor is at rest, means to and by which the loaf and its wrapper are carried in a succeeding step of movement of the conveyor, said means acting on the wrapper to complete the folding of the wrapper around the loaf at the bottom and ends thereof and to turn the projecting folded ends of the wrapper at the bottom of the loaf against the under side of the wrapped loaf, substantially as described.

2. In a bread wrapping machine, an endless conveyor having a plurality of pairs of projecting plates, means for moving said conveyor predetermined distances at periodic intervals, an elevator located below the conveyor adapted to have loaves of bread carried thereto at periodic intervals, a paper feed and cutting mechanism, means for operating the same normally disconnected therefrom, means operated by the passage of a loaf of bread to the elevator for rendering said operating means effective to feed and cut a predetermined length of paper, means for carrying said paper to a point between the elevator and conveyor whereby on upward movement of the elevator the bread is brought against the paper and both carried between a pair of said plates, means carried by the conveyor at separated points against which the upper projecting portions of the paper are brought acting to turn the paper downwardly against the ends of the loaf, means mounted horizontally and movable in a substantially horizontal plane toward and underneath the loaf while it is on the elevator, means for operating said means toward and slightly underneath the loaf and thence further under the loaf after the elevator has moved to lower position, plates carried by said horizontally moving means to pass alongside each end of the loaf, said horizontally moving means operating while the conveyor is at rest, and a stationary means located at the opposite side of the loaf and to and by which said loaf is carried on the next succeeding step of movement of the conveyor, said stationary means having spaced apart vertical plates between which the loaf passes, and guide slots into which projected folded ends of the wrapper are carried, turned downwardly and thence upwardly against the under side of the loaf, substantially as described.

3. In a bread wrapping machine, means to receive and grip each individual loaf and to carry it periodically step by step through the machine as the wrapper is being folded about the loaf, means mounted upon said gripping means and movable relative thereto for partially folding the wrapper at the respective ends of the loaf, and means for moving said end folding means relative to said gripping means whereby the end folding means will be moved to operative position at one location in the machine and will be moved out of operative position at other locations in the machine.

4. In a bread wrapping machine, an endless chain passing over sprockets at the respective ends of the machine and having its lower stretch extending parallel with the bed of the machine, a plurality of arms grouped in pairs and independently fastened to said chain, each pair of arms having gripping means near its ends to receive and grip a loaf of bread therebetween, means for retaining said arms in position to grip a loaf as the arms move over the bed of the machine, the gripping ends of said arms being arranged to separate as they pass over said sprockets whereby the loaf is released.

5. In a bread wrapping machine, loaf conveying mechanism comprising, two spaced apart endless chains passing over sprockets at the respective ends of the machine, a plurality of pairs of shafts extending between and carried by said chains, an arm mounted upon each shaft and extending outwardly from the chain, each pair of arms being provided near its outer ends with means for gripping a loaf between them, guide fingers attached to each shaft and having rollers at their extended ends, a track traversed by said rollers whereby the arms are retained in gripping position as they move parallel with the bed of the machine, and means for separating the gripping ends of the arms at the discharge end of the machine to release the loaf.

6. In a bread wrapping machine, loaf conveying mechanism comprising, two spaced apart edless chains passing over sprockets at the respective ends of the machine, a plurality of pairs of shafts extending between and carried by said chains, an arm mounted upon each shaft and extending outwardly from the chain, each pair of arms being provided near its outer ends with means for gripping a loaf between them, guide fingers attached to each shaft and having rollers at their extended ends, a track traversed by said rollers whereby the arms are retained in gripping position as they move parallel with the bed of the machine, and means for intermittently moving said chains whereby the loaves are moved step by step through the machine.

7. In a bread wrapping machine, loaf gripping and conveying mechanism comprising, two spaced apart endless chains passing over sprockets at the respective ends of the machine and having their lower stretches extending parallel with the bed of the machine, a plurality of pairs of shafts extending between said chains and carried thereby, arms mounted on said shafts and projecting at substantially right angles from the chains, each pair of arms being provided near its outer ends with loaf gripping means, two end folding arms pivotally mounted upon one of each pair of shafts and adapted, when lowered, to partially fold the wrapper against the ends of the loaf, means for raising the arms out of operative position, and means for lowering the arms into operative position.

8. In a bread wrapping machine, loaf gripping and conveying mechanism comprising, two spaced apart endless chains passing over sprockets at the respective ends of the machine and having their lower stretches extending parallel with the bed of the machine, a plurality of pairs of shafts extending between said chains and carried thereby, arms mounted on said shafts and projecting at substantially right angles from the chains, each pair of arms being provided near its outer ends with loaf gripping means, two end folding arms pivotally mounted upon one of each pair of shafts and adapted, when lowered, to partially fold the wrapper against the ends of the loaf, spring means to yieldably move said arms upward out of operative position, and cams upon said arms adapted to be engaged by fixed members to move the arms to lowered operative position.

9. In a bread wrapping machine having a horizontal bed, a loaf receiving station and a discharge end, a loaf gripping and conveying mechanism comprising, two spaced apart endless chains extending over sprockets at the respective ends of the machine and having their lower stretches extending parallel with the bed of the machine, a plurality of pairs of shafts extending between and carried by said chains, arms upon each shaft extending outwardly from the chains, each pair of arms being provided with loaf gripping means, means for intermittently moving said chains whereby the pairs of loaf gripping means will be successively stopped at the loaf receiving station, means for releasing the loaf from said gripping means at the discharge end of the machine, two end folding arms pivotally mounted upon one shaft of each pair, spring means to normally move said end folding arms out of operative position, cams upon said arms, and fixed means to engage said cams to move the arms into operative position at the said receiving station.

10. In a bread wrapping machine, an adjustable loaf gripping mechanism comprising, a pair of shafts extending transversely of the machine and mounted to move longitudinally of the machine, two arms mounted upon each shaft and adjustable longitudinally thereof, each arm being provided with means pivotally mounted upon one shaft and longitudinally adjustable thereof, springs to normally move the arms upward out of operative position, a cam upon each arm, and fixed means to engage said cams to move the arms into operative position.

11. In a bread wrapping machine, means for folding the bottom end flaps against the bottom of the load comprising, a bed, vertical members located at each side of the bed, to engage the respective ends of the loaf, the lower edges of said vertical members being spaced from the bed and inclined downwardly from the free ends of said members and, said lower edges merging into inwardly curved guides spaced away from and positioned below said bed, whereby the end flaps of the wrapper are engaged and folded downwardly and thence inwardly and upwardly against the bottom of the loaf as the loaf is moved through the device.

12. In a bread wrapping machine, means for folding the end flaps of the wrapper against the bottom of the loaf comprising, a bed plate of adjustable width over which the loaf is traversed, vertical members adjustably mounted at each side of said bed, the lower edges of said vertical members being spaced from said bed and inclined downwardly away from the free ends of said members and merging into inwardly and upwardly concaved guides disposed below said bed whereby the end flaps of the wrapper are folded downwardly and thence inwardly and upwardly against the bottom of the loaf as it is moved through the device.

13. In a bread wrapping machine, a vertically reciprocable elevator, means for depositing loaves successively upon said elevator, means for supporting a paper wrapper over the loaf in lower position, means for reciprocating said elevator, a horizontally movable plate adapted to be moved under the loaf in raised position, means for actuating said plate, the elevator reciprocating means being adapted to hold the elevator in raised position while the said plate moves partially under the loaf and to then lower the elevator, and the plate actuating means being adapted to hold the plate in partially advanced position until the elevator has been lowered and to then complete the forward movement of the plate.

14. In a bread wrapping machine, a vertically reciprocable elevator, means for depositing loaves successively thereon, means for supporting a paper wrapper over the loaf in lower position, means past which the loaf and wrapper are vertically moved for folding the wrapper downwardly over the sides of the loaf, means for receiving and gripping the partially wrapped loaf when raised, a horizontally and vertically movable plate adapted to move under the loaf in raised position, and means for actuating said plate to move it horizontally partially under the loaf while the elevator is in raised position and to continue the horizontal movement of the plate and also to raise it vertically under the loaf after the elevator has been lowered.

15. In a bread wrapping machine, a vertically reciprocable elevator, means for depositing loaves successively thereon, means for supporting a paper wrapper over the loaf in lower position, means past which the loaf and wrapper are vertically moved for folding the wrapper downwardly over the sides of the loaf, means for receiving and gripping the partially wrapped loaf when raised, a horizontally and vertically movable plate adapted to move under the loaf in raised position, and means fixed to the plate and moving therewith to engage the wrapper at the respective ends of the loaf and to partially fold the wrapper at said ends.

16. In a bread wrapping machine, a vertically reciprocable elevator, means for depositing loaves successively thereon, means for supporting a paper wrapper over the loaf in lower position, means past which the loaf and wrapper move when raised to fold the wrapper downwardly at the sides of the loaf, a horizontally movable plate adapted to move under the loaf when raised and to fold one edge of the wrapper thereunder, means for actuating said plate whereby it is moved partially under the loaf when the elevator is raised and the horizontal movement is completed after the elevator is lowered, and means fixed to the plate and moving therewith to engage the wrapper at the respective ends of the loaf to partially fold the wrapper at the ends of the loaf.

17. In a bread wrapping machine, a vertically reciprocable elevator, means for depositing loaves successively thereon, means for supporting a paper wrapper above the loaf in lower position, means past which the loaf and wrapper are moved when raised to fold the wrapper downwardly at the sides of the loaf, a horizontal plate mounted on rollers which traverse guides which impart a vertical movement to the plate as it is moved horizontally, and means for moving the plate partially under the loaf when the elevator is raised and for completing the horizontal movement combined with a vertical movement after the elevator is lowered.

18. A bread wrapping machine comprising a vertically reciprocable elevator, a loaf feeding device adapted to feed the loaves successively to said elevator, a loaf conveyor adapted to grip each individual loaf and convey it by intermittent steps through the machine, means for supporting a paper wrapper over the loaf when it is on the elevator in lower position, means past which the loaf and wrapper move as they are moved upwardly by the elevator to fold the wrapper downwardly over the sides of the loaf, end folding arms mounted upon and movable with said conveyor to engage the wrapper at the ends of the loaf to fold it downwardly, a horizontally movable plate adapted to be moved under the loaf when it is raised to fold one edge of the wrapper under the loaf, end folding members mounted upon and moving with said plate to engage the wrapper at the respective ends of the loaf to partially fold the wrapper at the ends, a plate arranged in a plane with the upper position of the loaf onto which the loaf is moved as the conveyor advances, vertical members arranged one at each side of said plate and spaced away from the same to engage the wrapper at the respective ends of the loaf to complete the end fold, the lower edges of said vertical members being inclined downwardly from the entrance end and merging into inwardly and upwardly curved guides whereby the bottom end flaps of the wrapper are bent first downwardly and then inwardly and upwardly against the bottom of the loaf, a heating device adjacent said plate adapted to heat the bottom and ends of the wrapper as the loaf is moved through it, a cooling trough engaged by the bottom and ends of the wrapper as the loaf is moved through it, and means for releasing and discharging said loaves from said conveyor.

19. In a bread wrapping machine, means for arranging a paper wrapper over the loaf, means for moving the loaf vertically to engage the paper wrapper and carry it upwardly, means past which the loaf and wrapper move as they are moved upwardly to fold the wrapper downwardly over the sides of the loaf, stationary means which the wrapper engages on its upward movement to fold the wrapper downwardly against the ends of the loaf, movable folding means to engage one side of the wrapper to fold it under the loaf and against the ends thereof, and stationary means past which the loaf and wrapper are moved to fold the opposite side of the wrapper against the bottom and ends of the loaf.

20. In a bread wrapping machine, means for arranging a paper wrapper over the loaf, means for moving the loaf vertically to engage the paper wrapper and carry it upwardly, means past which the loaf and wrapper move as they are moved upwardly to fold the wrapper downwardly over the sides of the loaf, stationary means which the wrapper engages on its upward movement to fold the wrapper downwardly against the ends of the loaf, movable folding means to engage one side of the wrapper to fold it over the loaf and against the ends thereof, stationary means past which the loaf and wrapper are moved to fold the opposite side of the wrapper against the bottom and ends of the loaf whereby end flaps are folded and extend horizontally from the respective ends of the loaf, and means for folding said end flaps against the loaf.

21. In a bread wrapping machine, the combination of a conveyor having a plurality of sets of grippers for engaging the individual loaves and wrappers and for holding the wrappers in position on the loaves during the folding operations, means for feeding the loaves and wrappers to the grippers with the wrappers draped over the tops and sides of the loaves, top end folders for turning the wrappers over the ends of the loaves as the latter are fed to said grippers, and means for intermittently operating the conveyor to advance the grippers and loaves step-by-step and for simultaneously moving said top end folders into and out of operative position.

22. In a bread wrapping machine, the combination of sets of movable and stationary folders for folding the opposite side portions of the wrappers beneath the bottoms and against the ends of the loaves, and an endless conveyor above said folders having sets of grippers arranged to project downwardly therefrom to engage the individual loaves and wrappers and move the same from said set of movable folders and past said set of stationary folders, means for lifting the loaves and wrappers between said sets of folders and into engagement with said grippers to thereby drape the wrappers over the tops and downwardly over the sides of the loaves, top end folders for turning portions of the wrappers downwardly over the ends of the loaves as the latter are lifted, and means for advancing said conveyor and grippers step-by-step and for simultaneously moving said top end folders into and out of operative position.

23. In combination in a bread wrapping machine, a substantially horizontal bed, a superposed, endless conveyor having a plurality of sets of projecting grippers, means for feeding the loaves and wrappers to said sets of grippers while the latter are held in position to engage and draw the wrappers snugly over the tops and downwardly over the sides of the loaves and means on said bed for folding the projecting portions of the wrapper over the bottoms and ends of the loaves and for heat-sealing the same while the wrappers are held in position on the loaves by said grippers.

24. In a bread wrapping machine, a substantially horizontal bed, a superposed endless conveyor having a plurality of sets of grippers arranged to depend from the lower reach of said conveyor to engage the individual loaves and wrappers, means for intermittently operating said conveyor to advance the grippers step-by-step and bring the same successively to a loaf receiving position, means for feeding the loaves and wrappers to the grippers in loaf receiving position while the conveyor is at rest and the grippers maintained in position to engage and draw the wrappers snugly over the tops and sides of the loaves, and means on said bed for folding the projecting portions of the wrappers beneath the bottoms and against the ends of the loaves and for heat-sealing the same while the wrappers are held in position on the loaves by said grippers.

25. In a bread wrapping machine, a set of stationary and a set of movable folders for respectively turning the edge portions at opposite sides of the wrappers under the bottoms and against the ends of the loaves, heated plates for sealing the wrappers, means for feeding the loaves and wrappers between said sets of folders with the wrappers draped over the tops and sides of the loaves, an intermittently operated, endless conveyor above said folders having downwardly projecting arms for engaging the loaves and moving the same step-by-step from said movable folders and to and past said stationary folders and sealing plates, and means for operating said movable folders during the pauses in the operation of said conveyor.

26. In a bread wrapping machine, a substantially horizontal bed, a superposed endless conveyor having a plurality of sets of projecting grippers, means for holding the grippers on the lower reach of said conveyor in position to securely hold the wrappers on the loaves and move the same over and in contact with said bed and for moving the grippers of each set apart at the delivery end of said conveyor to release the loaves, means for feeding the loaves and wrappers to said sets of grippers with the wrappers draped over the tops and sides of the loaves, and means on said bed for folding the projecting portions of the wrappers against the bottoms and ends of the loaves.

27. In a bread wrapping machine, a substantially horizontal conveyor way, an elevator for lifting the loaves and wrappers to an initial folding position at the entrance of the said conveyor way, an intermittently operated endless conveyor above said way having pairs of projecting gripper arms held against relative movement on the lower reach of the conveyor to receive and grip the loaves and wrappers as the latter are lifted and then move the same laterally step-by-step through said conveyor way, means for folding the projecting portions at one side of each wrapper against the bottom and ends of each loaf while the latter are sustained in the initial folding position, and means for completing the folding operation and for heat-sealing the wrappers as the loaves are moved laterally step-by-step through said conveyor way by said gripper arms.

28. In a bread wrapping machine, means for lifting each loaf and a superposed wrapper to an initial folding position, means operative as the loaf and wrapper are lifted for draping the wrapper over the top and downwardly over both the sides and ends of the loaf, movable folders for turning projecting portions at one side of the wrapper against the bottom and ends of the loaf with the side end folds overlapping the top end folds, stationary folding means for similarly folding the projecting portions of the wrapper at the other side of the loaf and leaving flaps projecting from the bottom end edges only of the loaf, stationary means for finally folding the flaps against the loaf, means for operating said movable folders while the loaf is held in initial folding position, and a conveyor for moving each loaf and wrapper from initial folding position and through and past said stationary folding means.

29. In combination in a bread wrapping machine, a substantially horizontal conveyor way, a superposed, intermittently operated endless conveyor above said way having a plurality of arms arranged to depend from the lower reach thereof to engage and move the loaves step-by-step over and in contact with the said conveyor way, an elevator for lifting each loaf and a centrally superposed wrapper to the entrance of said conveyor way and thereby drape the wrapper over the top and downwardly over the sides of the loaves, and movable plates for folding the projecting edge portions at one side of the wrapper while the loaf is held in position to which it is raised by said elevator, said conveyor way having means for completing the folding and for heat-sealing the wrapper as the loaf is moved step-by-step therethrough by said conveyor.

30. In a bread wrapping machine, an elevator for successively lifting the loaves and centrally superposed wrappers, a substantially horizontal endless flexible conveyor having upper and lower reaches and a plurality of grippers arranged to depend from the lower reach thereof to receive the loaves and wrappers as they are lifted and then move the same laterally, means for intermittently operating said conveyor to bring the grippers thereon successively to loaf-receiving position, and means for folding the projecting portions of the wrappers beneath the bottoms and against the ends of the loaves and for heat-sealing the wrapper folds while the wrappers are held snugly in position on the loaves by said grippers.

31. In combination in a bread wrapping machine, an intermittently operated, endless flexible conveyor having upper and lower reaches and a plurality of pairs of projecting grippers, means for feeding the loaves and wrappers to said grippers with the wrappers draped over the tops and sides of the loaves, means for folding the projecting portions of the wrappers against the bottoms and ends of the loaves, and means for heat-sealing the wrapper folds, said conveyor having means for holding the grippers of each pair in loaf receiving and wrapper-folding and sealing positions against relative movement and for moving the same apart at the delivery end of the conveyor to release the loaves.

32. In a bread wrapping machine, loaf gripping means, means for feeding each loaf and its wrapper to said gripping means to thereby drape the wrapper over the top and the sides of the loaf, and a folder for turning the projecting portion at one side of the wrapper against the bottom of the loaf while the latter is held in position by said gripping means, and means for reciprocating said folder across the opening of said loaf gripping means and also for moving it toward such opening.

33. In a bread wrapping machine, an intermittently operating conveyor for moving the loaves and wrappers laterally step-by-step, an elevator for lifting the loaves and wrappers to said conveyors with the wrappers draped over the top and downwardly over the sides of the loaves, top end folders for forming the initial end folds by turning the central end portions of the wrapper downwardly over the ends of the loaves, a set of folders for turning the projecting portions at one side of the wrapper under the bottom and against the ends of the loaves while the conveyor is at rest, and folders for similarly folding the projecting portions at the other side of the wrapper and for finally folding the wrapper peaks at the bottom end edges of the loaves as the latter are moved laterally by said conveyor.

34. In combination in a bread wrapping machine, an intermittently operated conveyor having depending grippers for receiving the loaves and wrappers and moving the same laterally, an elevator mechanism for lifting each loaf and its wrapper to said grippers and thereby draping the wrappers over the top and downwardly over the sides of the loaf, top end folders for turning the central end portions of the wrappers against the end of the loaf as the latter is lifted, means for moving said top end folders into and out of operative position as said grippers are moved into and out of loaf-receiving position, means for folding other portions of the wrapper beneath the bottom and over said top end folders while the conveyor is at rest, and means for completing the folding operation as the loaf is moved laterally by the said conveyor grippers.

35. In combination in a bread wrapping machine, an intermittently operated endless conveyor for moving the loaves and wrappers laterally step-by-step, an elevator for lifting the loaves and wrappers to said conveyor and thereby draping the wrappers over the tops and downwardly over the sides of the loaves, top end folders for turning the central end portions of the wrappers over the ends of the loaves as the latter are lifted, a movable set of folders for turning the projecting portions at one side of each wrapper under the bottoms and against the ends of the loaves and a set of stationary folders for folding the projecting portions at the other side of the wrapper and for finally folding the wrapper peaks at the bottom end edges of the loaves as the latter are moved laterally by said conveyor, means for intermittently operating said conveyor and for simultaneously moving said top end folders into and out of operative position, and means for effecting the operating movements of said elevator and said movable folders while the conveyor is at rest.

36. In a bread wrapping machine, the combination of a substantially horizontal bed, wrapper folding and sealing means thereon, an intermittently operated, longitudinally extending conveyor arranged above said bed for moving the loaves over and in contact with said bed and into cooperative relation with said folding and sealing means, a vertically reciprocating plunger for lifting each loaf and its wrapper to said conveyor while the latter is at rest, a longitudinally extending feed-way for the loaves at one side of said plunger, a continuously operating, transversely disposed conveyor having flights for engaging the loaves in said feed-way and delivering the same one at a time on to said reciprocating plunger when the latter is in its lowermost position, and mechanism for reciprocating said plunger and for operating said conveyors in timed relation.

37. In a bread wrapping machine, means for arranging a paper wrapper over the loaf, means for elevating the loaf to engage the wrapper and carry it upwardly with the wrapper draped downwardly against the sides of the loaf, a gripper located above the loaf having yieldable gripping members between which the loaf and wrapper are thrust by said elevating means, a plate adapted to move under the loaf and means for actuating said plates to move it horizontally under the loaf and also vertically to thrust the loaf and wrapper farther into said gripping means and means to complete the folding of the wrapper.

In testimony whereof I affix my signature.
CHARLES OWEN BROWNELL.